(12) United States Patent
Huang et al.

(10) Patent No.: US 12,153,535 B2
(45) Date of Patent: Nov. 26, 2024

(54) PORTABLE MOBILE PRIVATE NETWORKS USING PLUGGABLE HARDWARE MODULES

(71) Applicant: Amazon Technologies, Inc., Seattle, WA (US)

(72) Inventors: Jiandong Huang, San Jose, CA (US); Frank Paterra, Oakton, VA (US); Ryan L Sanders, Pike Road, AL (US)

(73) Assignee: Amazon Technologies, Inc., Seattle, WA (US)

( * ) Notice: Subject to any disclaimer, the term of this patent is extended or adjusted under 35 U.S.C. 154(b) by 55 days.

(21) Appl. No.: 18/067,650

(22) Filed: Dec. 16, 2022

(65) Prior Publication Data

US 2024/0202153 A1 Jun. 20, 2024

(51) Int. Cl.
  *G06F 13/40* (2006.01)
  *G06F 13/38* (2006.01)

(52) U.S. Cl.
  CPC ........ *G06F 13/4022* (2013.01); *G06F 13/385* (2013.01); *G06F 13/4068* (2013.01)

(58) Field of Classification Search
  None
  See application file for complete search history.

(56) References Cited

U.S. PATENT DOCUMENTS

| | | |
|---|---|---|
| 8,539,079 B2 | 9/2013 | Thireault |
| 9,125,047 B2 | 9/2015 | Sundaresan et al. |
| 9,703,660 B2 | 7/2017 | Cillis et al. |
| 9,838,268 B1 | 12/2017 | Mattson |
| 9,876,851 B2 | 1/2018 | Chandramouli et al. |
| 10,064,242 B2 | 8/2018 | Pawar et al. |
| 10,135,702 B2 | 11/2018 | Lahiri |
| 10,244,507 B2 | 3/2019 | Tarlazzi et al. |
| 10,257,105 B2 | 4/2019 | Majmundar et al. |
| 10,419,550 B2 | 9/2019 | Nainar et al. |
| 10,581,717 B2 | 3/2020 | Tejaprakash et al. |
| 10,594,456 B2 | 3/2020 | Park et al. |
| 10,608,734 B2 | 3/2020 | Barbieri et al. |
| 10,705,808 B2 | 7/2020 | Chiosi et al. |
| 10,749,721 B2 | 8/2020 | Fertonani et al. |
| 10,750,514 B2 | 8/2020 | Fujinami |
| 10,817,409 B2 | 10/2020 | Zeng et al. |

(Continued)

OTHER PUBLICATIONS

International Search Report and Written Opinion mailed Feb. 28, 2024 in PCT/US2023/080103, Amazon Technologies, Inc., pp. 1-13.

(Continued)

*Primary Examiner* — Henry Tsai
*Assistant Examiner* — Aurangzeb Hassan
(74) *Attorney, Agent, or Firm* — Robert C. Kowert; Kowert, Hood, Munyon, Rankin & Goetzel, P.C.

(57) ABSTRACT

Attachment of a pluggable module to an externally-accessible slot of a base unit of a server is detected. The module is configured to execute a first network function of a radio-based communication network. In response to a determination that the module satisfies a security criterion, a second network function is launched. The second network function performs one or more computations on output of the first network function. The output of the first network function is generated at the module in response to a message from a user equipment device of a radio-based communication network.

20 Claims, 21 Drawing Sheets

(56) References Cited

U.S. PATENT DOCUMENTS

| | | | |
|---|---|---|---|
| 10,880,173 B2 | 12/2020 | Seenappa et al. | |
| 10,944,668 B2 | 3/2021 | Rajagopal | |
| 10,959,098 B2 | 3/2021 | Cidon et al. | |
| 10,999,783 B2 | 5/2021 | Pateromichelakis | |
| 11,025,340 B2* | 6/2021 | Hashemi | H04B 10/27 |
| 11,190,413 B1 | 11/2021 | Priya et al. | |
| 11,356,500 B1 | 6/2022 | Gupta et al. | |
| 11,539,582 B1 | 12/2022 | Gupta et al. | |
| 11,552,842 B2 | 1/2023 | Barabell | |
| 11,916,999 B1* | 2/2024 | Gupta | H04W 28/08 |
| 11,937,103 B1* | 3/2024 | Krasilnikov | H04W 24/02 |
| 2012/0127151 A1 | 5/2012 | Murakami | |
| 2013/0028075 A1* | 1/2013 | Agulnik | H04L 45/28 370/221 |
| 2018/0131401 A1* | 5/2018 | Bonde | H04B 1/406 |
| 2018/0146375 A1 | 5/2018 | Pawar et al. | |
| 2018/0365635 A1 | 12/2018 | Lucrecio et al. | |
| 2019/0042326 A1 | 2/2019 | Chilikin | |
| 2019/0158606 A1 | 5/2019 | Guim Bernat et al. | |
| 2019/0165906 A1 | 5/2019 | Bala et al. | |
| 2019/0190785 A1 | 6/2019 | Power | |
| 2019/0213029 A1 | 7/2019 | Liu et al. | |
| 2019/0289497 A1 | 9/2019 | Rajagopal | |
| 2019/0391855 A1 | 12/2019 | Bernat et al. | |
| 2019/0394826 A1 | 12/2019 | Wang et al. | |
| 2020/0235607 A1* | 7/2020 | Kanarellis | H04L 41/0661 |
| 2020/0245229 A1 | 7/2020 | Horn et al. | |
| 2020/0314033 A1* | 10/2020 | Hirota | H04L 12/4641 |
| 2021/0006944 A1 | 1/2021 | Raghothaman et al. | |
| 2021/0073047 A1 | 3/2021 | Bhandaru | |
| 2021/0144517 A1 | 5/2021 | Guim Bernat et al. | |
| 2021/0144555 A1 | 5/2021 | Kim et al. | |
| 2021/0243072 A1 | 8/2021 | Peterson et al. | |
| 2021/0243770 A1 | 8/2021 | Roessler | |
| 2021/0271517 A1 | 9/2021 | Guim Bernat | |
| 2022/0030117 A1 | 1/2022 | Young et al. | |
| 2022/0046084 A1 | 2/2022 | Nair | |
| 2022/0070734 A1 | 3/2022 | Rajagopal | |
| 2022/0245081 A1* | 8/2022 | Orcic | G06F 13/409 |
| 2022/0377615 A1 | 11/2022 | Radunovic | |
| 2023/0056803 A1* | 2/2023 | Gomez | G01S 19/235 |
| 2023/0130665 A1* | 4/2023 | Royle | G01S 19/235 368/47 |
| 2024/0045744 A1* | 2/2024 | Richards | G06F 15/17 |
| 2024/0073846 A1* | 2/2024 | Menon | H04W 60/00 |

OTHER PUBLICATIONS

U.S. Appl. No. 17/548,391, filed Dec. 10, 2021, Ammar Latif et al.
U.S. Appl. No. 17/807,341, filed Jun. 16, 2022, Upendra Bhalchandra Shevade et al.
U.S. Appl. No. 17/807,343, filed Jun. 16, 2022, Upendra Bhalchandra Shevade et al.
U.S. Appl. No. 17/807,344, filed Jun. 16, 2022, Upendra Bhalchandra Shevade et al.
U.S. Appl. No. 17/808,518, filed Jun. 23, 2022, Ozgur Dural.
U.S. Appl. No. 17/326,221, filed May 20, 2021, Ximeng Simon Yang.
U.S. Appl. No. 17/461,785, filed Aug. 30, 2021, Diwakar Gupta.
U.S. Appl. No. 17/710,571, filed Mar. 31, 2022, Manjari Asawa.
U.S. Appl. No. 17/806,684, filed Jun. 13, 2022, Benjamin Wojtowicz.
U.S. Appl. No. 17/806,685, filed Jun. 13, 2022, Benjamin Wojtowicz.
U.S. Appl. No. 17/810,319, filed Jun. 30, 2022, Julius Mueller, at al.
U.S. Appl. No. 17/809,864, filed Jun. 29, 2022, Nikolay Kirschenmann, et al.
U.S. Appl. No. 17/820,542, filed Aug. 17, 2022, Nikolay Kirschenmann, et al.
Unknown, "5G; NG-RAN; Architecture Description", Technical Specification, ETSI TS 138 401, Version 16.8.0, Release 16, Jan. 2022, pp. 1-82.
Ashfaq Ahmed, et al., "Hybrid Automatic Repeat Request (HARQ) in Wireless Communication Systems and Standards: A Contemporary Survey", IEEE Communications Surveys & Tutorials 23.4, 2021, pp. 2711-2752.
U.S. Appl. No. 17/326,218, filed May 5, 2021, Ximeng Simon Yang.
U.S. Appl. No. 17/364,779, filed Jun. 30, 2021, Diwakar Gupta et al.
U.S. Appl. No. 17/364,788, filed Jun. 30, 2021, Diwakar Gupta et al.
U.S. Appl. No. 17/364,791, filed Jun. 30, 2021, Diwakar Gupta et al.
U.S. Appl. No. 18/146,126, filed Dec. 23, 2022, Diwakar Gupta et al.
U.S. Appl. No. 18/066,943, filed Dec. 15, 2022, Awaiz Ahmad Khan et al.
U.S. Appl. No. 18/067,654, filed Dec. 16, 2022, Frank Paterra et al.
U.S. Appl. No. 18/067,651, filed Dec. 16, 2022, Frank Paterra.

\* cited by examiner

Approved PHM metadata 1202

User-friendly module name 1204

Module category identifier 1206

Module category public key 1208

Mounting information 1209

Virtual machine image 1210

Auto-start flag 1212

PORTABLE MOBILE PRIVATE NETWORKS USING PLUGGABLE HARDWARE MODULES

BACKGROUND

During and after several kinds of extreme events, such hurricanes or earthquakes, traditional communication technologies may not be available for some time. For example, cell phone towers may be damaged, power may be unavailable, and so on. Reliable communication may be critical, however, among teams of first responders and other personnel, especially during time periods in which search and rescue operations have to be performed to save lives. Furthermore, the first responders may have to interact with one another not just while they are stationary, but also as they move across potentially large remote areas experiencing extreme environmental conditions.

BRIEF DESCRIPTION OF DRAWINGS

FIG. 12 illustrates examples of the kinds of metadata, pertaining to pluggable hardware modules, which may be stored at a field-reconfigurable server, according to at least some embodiments.

Figure 1:
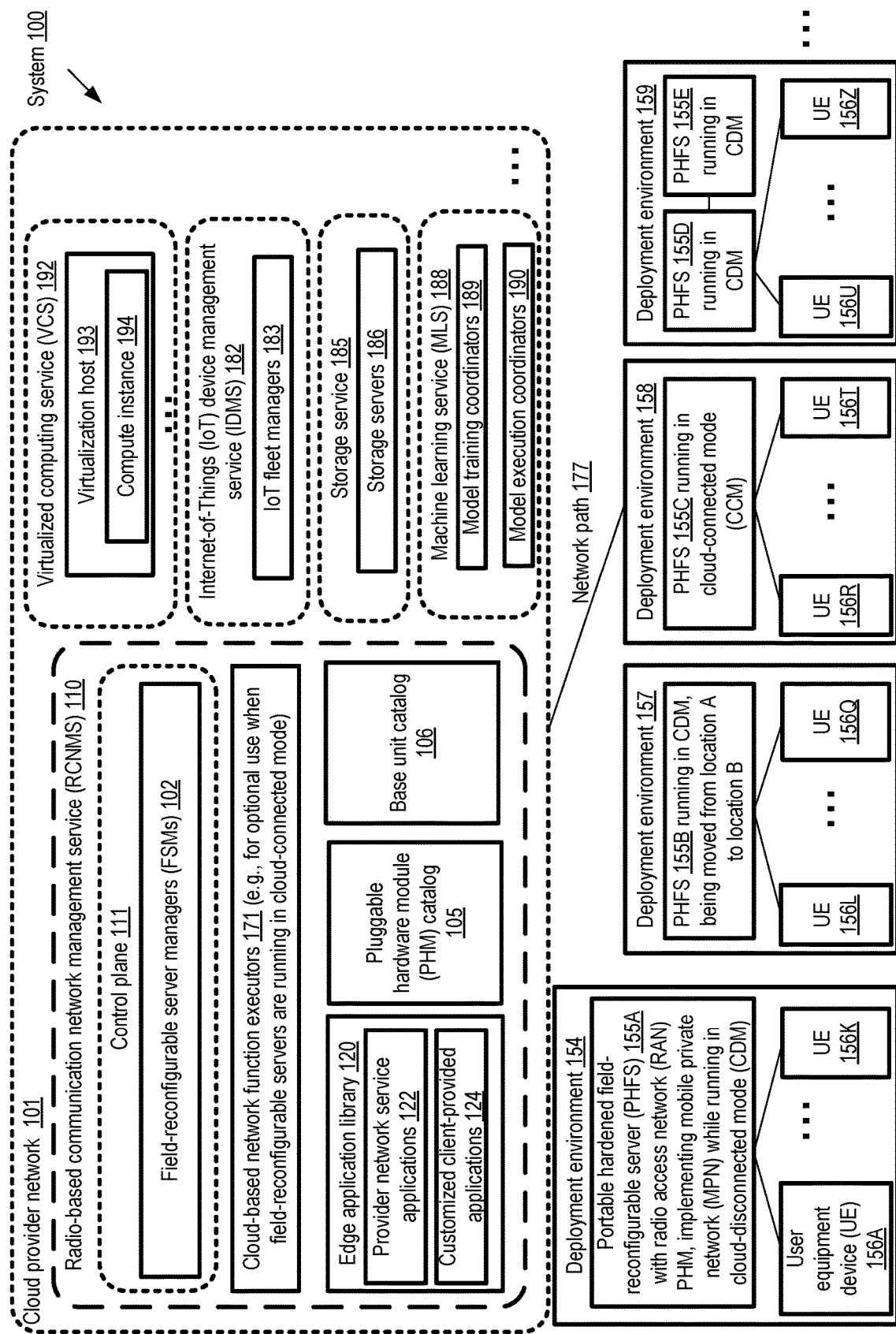
FIG. 1 illustrates an example system environment in which portable hardened field-reconfigurable servers of a cloud provider network may be utilized for mobile private networks and other applications run in a cloud-disconnected mode, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

DETAILED DESCRIPTION

The present disclosure relates to lightweight, environmentally-hardened servers, designed and supported by a cloud provider network operator, to implement mobile private networks (MPNs) and other applications using pluggable hardware modules in locations in which connectivity is unavailable to the data centers of the cloud provider network. Examples of such locations can include disaster recovery areas, such as areas in which earthquakes, wildfires, hurricanes and the like have recently occurred. Preliminary configuration of the servers (for example, installation of virtualization management software that enables virtual machines to be launched in the field, without communication with the cloud provider network) can be performed at the cloud provider network from which the servers are shipped. After optional additional configuration of such a server, for example at an office near a disaster recovery area where the server is to be used for an MPN enabling communication among a group of first responders as they perform search and rescue tasks, the server can be provided to a particular first responder or end user. The server can be compact and light enough to be carried around, if desired, by such an individual, e.g., in a backpack while the applications (including an MPN) remain running at server; alternatively, it can be kept stationary if desired. As used herein, the term server refers to a computing device. Note that in scenarios in which a lightweight environmentally-hardened computing device is being used for an MPN, it does not play the role of a server in a traditional client-server relationship, as there are no clients that send requests to the computing device and obtain responses to such requests. In other use cases, such a device can be used to implement a wide variety of other applications or services, and so can provide functionality similar to that of a traditional server.

At least a subset of the network functions of an MPN can be implemented using a pluggable hardware module (PHM), provided by the cloud provider network operator, that can easily be physically attached to a base unit of the server without requiring disassembly of the enclosure of the base unit, and without power-cycling the server. The base unit can contain a set of primary processors (such as CPUs), memory and storage of the server. The PHM can contain several types of circuitry, including auxiliary processors that can run software versions of radio access network (RAN) node network functions, as well as special-purpose circuitry implementing RAN hardware functions such as an RF (radio frequency) front end with an RF amplifier and filters, RF integrated circuits (ICs), and Low and High Physical RF components. An antenna which can be used to receive and transmit signals in radio frequency ranges used for 4G-LTE ($4^{th}$ generation Long Term Evolution) or 5G ($5^{th}$ generation) cellular communication can be incorporated in, or attached to, the base unit or the PHM. The enclosures of the base unit and the PHM can be hardened prior to shipment from the cloud provider, to withstand various kinds of extreme environmental conditions such as high and low temperatures, shocks, vibrations, poor air quality and the like. Other similarly compact and hardened PHMs can be attached to the server, in addition to or instead of, the MPN PHM to run respective applications, including for example image or video processing applications, analysis of data collected from various types of sensors, and the like. For example, the enclosure of the base unit can contain multiple externally-accessible slots for attaching respective PHMs, and data can be transferred between a given PHM and the base unit via one or more physical interfaces of the slots, such as Peripheral Component Interconnect—Express (PCIe) or Universal Serial Bus (USB) physical interfaces. A given slot can be used to physically insert a PHM into an opening, such that the PHM remains attached to the base unit without requiring the use of screw drivers or other similar tools. The servers are referred to herein as portable hardened field-reconfigurable servers (PHFSs). The servers can be described as field-reconfigurable because end users such as first responders can quickly and easily reconfigure the servers by plugging in an appropriate combination of PHMs for a variety of applications while the servers remain deployed in the field (e.g., in areas in which facilities such as Internet connectivity and reliable power lines, which are typically available at data centers and offices, are absent or available only intermittently). A given PHFS can comprise a base unit and optionally one or more PHMs. PHMs can be attached to or detached from a base unit of a PHFS without requiring stopping, shutting down or rebooting/restarting the base unit (or any programs or systems software running at the base unit); as such, the PHMs can be referred to as hot-pluggable or hot-swappable modules.

PHFSs can operate in several different modes with respect to the extent to which connectivity to the cloud is available. For example, in a cloud-disconnected mode (CDM), in which connectivity is not available to the data centers of the cloud provider network, local versions of cloud-based services (such as storage services, machine learning services) can be run at a PHFS, and used to store and process data transferred via messages of an MPN being implemented using the server. If and when connectivity to the cloud provider network's data centers becomes available, the PHFS can transition to a cloud-connected mode (CCM) of operation. In the CCM, resources of the cloud can be utilized from the PHFS as needed, e.g., to transfer application data and/or metrics collected at the PHFS to the cloud, to obtain updated versions of the programs implementing the cloud-based services, to run portions of the applications (such as an MPN itself) that were being run entirely at the PHFS in cloud-disconnected mode, and so on. Because they are often utilized in locations external to the data centers of the cloud provider network, PHFSs can also be referred to as edge computing devices.

A number of techniques can be implemented to ensure security of MPNs and other applications implemented at PHFSs. For example, only a few categories of PHMs may be approved for a given PHFS by a cloud provider network client that orders the PHFS, and metadata for only the approved PHMs may be stored in an encrypted data store at the PHFS (e.g., part of the boot media of the PHFS). When attachment of a particular PHM is detected at the PHFS by a configuration manager (CM) program or service running in privileged mode on the PHFS, the CM can ensure that the PHM is among the approved PHMs, and can authenticate the PHM using security artifacts specific to the PHM or the PHM's category before allowing the PHM to be used for an application. A PHFS can be deployed to the field in a locked state, in which applications such as MPNs are not allowed to run until the PHM has received a verifiable unlock request or signal from an authorized entity. Unlock-enabling metadata can be stored, using instructions or guidance provided by the cloud provider network operator, in advance of PHFS deployment on a small set of radio-equipped devices assigned to a set of end users by an administrator of the PHFS. In the field, after the PHFS is powered on, it can still be kept locked until and unless an unlock request message whose contents were generated using the unlock-enabling metadata is received at the PHFS. To securely enable local Internet Protocol (IP) network setup for a PHFS, available USB ports of the PHFS can be scanned to determine whether a USB device that stores authentication information required for network setup is present in one of the ports. If such a device is found, a console for providing networking parameters can be launched using a pre-selected IP address, and a local network can be set up using input received via the console. Other security mechanisms can be employed for various facets of the management and use of PHFSs. PHFSs can also be used for applications such as communication among autonomous vehicles, robot and drone management, and so on.

As one skilled in the art will appreciate in light of this disclosure, certain embodiments may be capable of achieving various advantages, including some or all of the following: (a) enabling MPNs, using pluggable modules which can be selected based on desired hardware network function capabilities and performance levels, to be set up and used in environments in which cell phone connectivity is unavailable from conventional cell towers, e.g., for communication among moving groups of first responders in disaster recovery areas and/or (b) simplifying the collection and analysis of a variety of sensor data from remote locations.

According to some embodiments, a system may comprise a server such as a PHFS, provided by or from a cloud provider network, which includes a set of primary processors, a memory and a radio antenna. An enclosure, chassis or case within which the primary processors and the memory are incorporated may comprise a set of externally-accessible slots for attaching one or more pluggable hardware modules to the server without disassembly of the enclosure. The system may also include a pluggable RAN module (one example of a pluggable hardware module or PHM of the kind introduced above) comprising an auxiliary processor as well as circuitry for implementing radio frequency (RF) functions. The auxiliary processor may implement a first set of one or more network functions of a RAN node of a radio-based communication network (RCN) in various embodiments. The term "radio-based communication network" (RCN) is used herein to refer to networks in which at least some messages are transmitted using radio frequency signals and associated antennas, such as those used for various generations (4G, 5G and the like) of cellular broadband technologies. A mobile private network (MPN) is one example of an RCN. The RAN module may be referred to as a pluggable network function execution module in some embodiments. A set of preparatory configuration tasks of the server may have been performed at a cloud provider network or cloud computing environment. The memory may include program instructions that when executed on a primary processor implement a configuration manager that detects, e.g., during a time interval in which connectivity to the provider network is unavailable, that the pluggable RAN module has been attached to the server via a particular externally-accessible slot. In response to determining that the pluggable RAN module satisfies a security criterion (e.g., based on verifying authentication information obtained from the module), a second set of one or more network functions may be launched automatically at the server in some embodiments, e.g., by the configuration manager using a virtualization manager which was installed on the server at the cloud provider network. The second set of network functions may also be launched and run during a time interval in which connectivity between the server and the cloud provider network is unavailable. In at least one embodiment, this second set of network functions may include a network function of a mobile core network of the RCN.

The first and second sets of network functions may then be executed to implement the RCN. For example, a message from a user equipment device (UE) of the RCN, such as a cellular phone or an Internet-of-Things (IoT) device may be received at the server via the antenna, processed using the RF circuitry of the pluggable RAN module, and then the first set of network functions may be executed with respect to the message at the auxiliary processor of the pluggable RAN module. Output of the first set of network functions may be processed at the second set of network functions. In scenarios in which the message is part of a communication session between the first UE and a second UE, contents of the message may be sent to the second UE using some or all of the network functions, executed for example in the reverse order to the order in which they were executed to process the received message from the first UE. If and when connectivity to the cloud provider network becomes available, RCN metrics (including metrics collected at the server during the time period in which connectivity to the cloud provider network was unavailable) may be transmitted to a resource at the cloud provider network in at least some embodiments.

In some embodiments, the RCN may continue to process UE messages without disruption or interruption while the server is being moved from place to place, e.g., within a backpack worn by an individual, or within a moving vehicle. For example, the RAN module may have been attached to the base unit, and the second set of network functions may have been launched, during a time interval in which the server is at a particular location. Some messages of a given communication session of a UE may be processed while the server remains stationary in that location. During a subsequent time interval in which the server is being transported or moved to a different location, addition processing of output generated by the first set of network functions (e.g., for additional messages of the same communication session) may be performed at the second set of network functions.

In one embodiment, the RAN module attached to the server may be one of a family of RAN modules with different supported functionality or different performance capacity that can be obtained from a cloud provider network, and a user may simply substitute one RAN module for another in the field to handle changing performance or functional requirements of an RCN. For example, a first RAN module which is attached to a PHFS may have a first maximum rate at which a particular network function can be executed. The configuration manager of the PHFS may detect that the first RAN module has been detached from the PHFS, and that a second RAN module with a higher performance capacity has been attached in place of the first RAN module while the PHFS remains powered on. After the configuration manager verifies that the second RAN module also satisfies a security criterion, the second RAN module may be used to execute the particular network function at a higher rate than the first maximum rate. Similarly, one RAN module which implements a particular set of network functions may be dynamically replaced by a second RAN module which implements a different set of network functions in some embodiments, where at least one network function implemented at the second RAN module is not a member of the particular set. In addition to RAN modules, other kinds of PHMs may be attached to the server via its externally-accessible slots, such as PHMs that perform analysis or computations on data obtained via messages received via a RAN module. At least some of the other PHMs may perform computations that are not network functions of a radio-based communication network, and/or are unrelated to radio-based communication networks as such. In some embodiments, the RAN module and/or other PHMs may transfer data to the base unit of a PHFS via one or more physical interfaces accessible via an externally-accessible slot, such as a PCIe interface, a USB interface, or both a PCIe and a USB interface. In one embodiment, physical interfaces that are neither PCIe interfaces nor USB interfaces may be employed.

According to some embodiments, one or more virtual machines or compute instances of a virtualized computing service (VCS) of a cloud provider network or cloud computing environment may be launched and run at a PHFS while the PHFS lacks connectivity to a data center of the cloud provider network. Such a virtual machine may implement at least some programmatic interfaces (such as APIs) that are implemented by VCS compute instances running at data centers of the provider network, and hence may be described as implementing programmatic interfaces of the VCS. One or more network functions of an RCN such as an MPN may be executed within such a virtual machine in such embodiments. In at least one embodiment, a program implementing at least a portion of the functionality of a network-accessible service of the cloud computing environment, and hence referred to as a local version of the service, may be launched at a PHFS. Such programs may be used to process data received from UEs of the RCN, e.g., while the server does not have connectivity to data centers of the cloud computing environment.

In at least one embodiment, metadata associated with a group of categories of PHMs that has been approved for a PHFS may be stored at the PHFS. Such metadata may be used, for example, to determine whether a PHM such as a RAN module satisfies security criteria, to launch virtual machines, and so on.

According to some embodiments, a system may comprise a server (such as a PHFS) which includes a set of primary processors and a memory, a first PHM, and a second PHM. An enclosure, chassis or case within which the primary processors and the memory are incorporated may comprise a set of externally-accessible slots for attaching one or more PHMs to the server without disassembly of the enclosure. The first PHM may be configured to execute at least a portion of a first application, while the second PHM may be configured to execute at least a portion of a second application which differs from the first application. The memory may store program instructions that when executed on a primary processor cause, in response to input received via one or more programmatic interfaces, metadata pertaining to a set of approved PHMs to be stored at a local storage device of the server, e.g., in an encrypted read-write portion of boot media of the server. The instructions when executed on the primary processor may detect that the first PHM has been attached to the server via a particular slot of the set of externally-accessible slots.

In response to determining that the first PHM is in a list of approved pluggable hardware modules, a first digital certificate or similar security artifact may be obtained from the first PHM in some embodiments. The list of approved PHMs may be included in the metadata stored at the local storage device. The first digital certificate or artifact may then be validated, e.g., using a first public key associated with the first PHM in various embodiments. The first public key may also be part of the metadata pertaining to approved PHMs in some embodiments. If the validation of the first digital certificate succeeds, a first program running within a first virtual machine launched at the server may be enabled to access application data of the first application from the first PHM in various embodiments.

In response to detecting that the first PHM has been detached from the server (e.g., while the server remains powered on), state information of the first application may be saved at the server in various embodiments. Subsequently, an attachment of the second PHM to the server via the same slot which was used earlier to attach the first PHM may be detected. In response to detecting that the second PHM is also in the list of approved PHMs, a second digital certificate or similar security artifact may be obtained from the second PHM. If the second digital certificate is successfully validated, e.g., using a second public key which is also included in the metadata, a second program running within a second virtual machine launched at the server may be enabled to access application data of the second application from the second PHM in at least one embodiment. In some embodiments, security artifacts other than public keys may be used to validate the digital certificates.

According to at least some embodiments, a machine image that is used to launch the virtual machine within which the program that access application data from the PHM may be included in the metadata pertaining to approved PHMs. In one embodiment, the metadata may also include module mounting configuration information, which may be used to mount the PHMs (i.e., run the logical equivalent of "mount" commands of Linux-based operating systems with respect to the PHMs) to enable application data to be obtained from the PHMs. In at least some embodiments, each server or PHFS may have an associated set of server-specific cryptographic keys assigned by a service of a cloud computing environment. Such a server-specific cryptographic key may be obtained at a server, e.g., via input provided by an administrator using a programmatic interface. In embodiments in which the metadata pertaining to approved PHMs is stored in encrypted form on the local storage device of a PHFS, a server-specific cryptographic key may be used to decrypt the metadata.

The metadata about acceptable PHMs may be exported, e.g., as a file or other object, from one PHFS in response to a programmatic request from an administrator, and imported at a different PHFS to enable the same kinds of PHMs to be used at the different PHFS in some embodiments. In some embodiments, after execution of a first application using a first PHM of a PHFS, an administrator may determine that that application is no longer going to be run at the PHFS. In such a scenario, the portion of the approved-PHM metadata that applies to the first PHM may be deleted from the PHFS, e.g., in response to a programmatic request from the administrator. Even if the first PHM is then re-attached to the PHFS, the lack of corresponding metadata may ensure that the first PHM can no longer be used to run the first application (or any application) at the PHFS in such embodiments. In at least some embodiments, an indication of the PHMs that have been designated as acceptable using the metadata stored at a PHFS may be provided via a programmatic interface upon request, e.g., to an administrator or end user of the PHFS. A variety of PHMs for implementing respective kinds of applications may be used at a PHFS in some embodiments, including PHMs whose circuitry or auxiliary processors can be used to implement a portion of an RCN such as an MPN or private cellular network (PCN), analysis of signals received from IoT devices, execution of machine learning models, tasks of search-and-rescue operations, and so on. Multiple PHMs may be attached to a given PHFS concurrently, and used to run different applications (including RCNs) as needed during overlapping time intervals in various embodiments.

In at least some embodiments, a system may comprise a control plane server located at a data center of a cloud computing environment or cloud provider network, and a field-reconfigurable server such as a PHFS. The field-reconfigurable server (FS) may include a base unit and a PHM attached to the base unit. The base unit may comprise an enclosure containing a set of primary processors at which a configuration manager is run. The PHM may be attached to the base unit via an externally-accessible slot of the enclosure. The PHM may comprise an auxiliary processor for implementing at least a subset of a first application (such as an MPN or another RCN). Attachment, to the base unit via the externally-accessible slot, of individual ones of a plurality of PHMs may not require disassembly of the enclosure or the base unit. Individual ones of the PHMs may include respective auxiliary processors for implementing at least a subset of functionality of respective applications. The control plane server may cause one or more configuration operations to be performed at the field-reconfigurable server to enable the field-reconfigurable server to execute the first application while the field-reconfigurable server is operating in a cloud-disconnected mode in various embodiments. Such configuration operations may include, for example, causing a standalone virtualization manager to be installed at the field-reconfigurable server, which can launch compute instances locally at the field-reconfigurable server without having to communicate with the cloud computing environment, and which is not required to report status information or metrics of the compute instances to the cloud computing environment. In the cloud-disconnected mode, network connectivity may be unavailable between the field-reconfigurable server and the data center of the cloud computing environment. In at least some embodiments, unlocking metadata associated with the field-reconfigurable server may be transmitted by the control plane server via a programmatic interface to an administrator of the field-reconfigurable server, along with instructions or guidelines for storing at least a portion of the unlocking metadata at radio-equipped devices (such as radio transmitter/receivers provided to authorized/trusted end users of the applications to be run using the field-reconfigurable server).

At some point in time, e.g., prior to deployment to the field, the field-reconfigurable server may be placed or configured into a locked state. While the field-reconfigurable server remains in the locked state, execution of the first application (and/or additional applications) may be prohibited or blocked in various embodiments, e.g., via configuration settings that prevent commands for launching the first application from being received or executed at the field-reconfigurable server. In one implementation, for example, in order to start the first application, a compute instance or virtual machine may have to be launched by a virtualization manager using a machine image associated with the first application. The virtualization manager may be configured to examine, before it starts up any compute instance at the field-reconfigurable server, a flag indicating whether the field-reconfigurable server is in an unlocked state or in a locked state. Launching of the compute instance may only be permitted if the flag indicates that the field-reconfigurable server is in an unlocked state. Other approaches may be used to prevent or prohibit execution of applications while the field-reconfigurable server is in a locked state in different embodiments.

During a time period in which (a) network connectivity is unavailable between the field-reconfigurable server and the data center of the cloud computing environment and (b) the field-reconfigurable server is in the locked state, a radio message (a message sent using radio frequency signals) may be received at the field-reconfigurable server. A determination may be made at the field-reconfigurable server, using a primary processor, as to whether content of the radio message was generated using the unlocking metadata, and/or satisfies other criteria associated with the unlocking metadata. If it is determined that the content was not generated using the unlocking metadata, the field-reconfigurable server remain in the locked state in various embodiments. If, in contrast, a determination is made that content of a radio message received at the field-reconfigurable server was generated using the unlocking metadata, and that any other applicable unlocking criteria associated with the unlocking metadata have been met, the field-reconfigurable server may be caused to exit the locked state. After the field-reconfigurable server has exited the locked state, execution of the first application may be initiated, and a portion of the first application may be executed using the auxiliary processor of the first PHM.

In at least some embodiments, an indication of a rule for evaluating the contents of the radio messages to determine whether the contents satisfy a criterion for unlocking the field-reconfigurable server (e.g., the criterion that the contents must have been generated using the unlocking metadata, timeout periods within which the radio message contents remain valid for unlocking the server, etc.) may be stored at the server in an encrypted format, e.g., within boot media of the server. The rule may be decrypted (e.g., using a server-specific key provided by an administrator of the field-reconfigurable server) and used to evaluate the contents of the radio messages in such embodiments. In at least some embodiments, a radio message that satisfies the criterion for unlocking may contain a cryptographic artifact (such as a unique cryptographic key) assigned to a radio-equipped user device (such as a device similar to a tactical radio) by an administrator of the field-reconfigurable server.

According to one embodiment, during a boot procedure of the field-reconfigurable server, one or more peripheral device ports of the server that may contain external devices such as USB devices may be scanned, e.g., by the configuration manager running at the field-reconfigurable server, to determine whether a device containing an authentication artifact pertaining to IP networking setup of the server is attached. If such a device is found, a programmatic interface such as a web-based console for networking setup of the server may be launched at the server and made accessible via a pre-selected IP address. IP connectivity between the field-reconfigurable server and endpoints external to the server may be enabled using configuration settings received via the interface in various embodiments.

In various embodiments, as indicated above, the application run at the field-reconfigurable server may be an RCN such as an MPN. In such embodiments, one or more network functions of the RCN (such as RAN node network functions) may be executed at one or more PHMs, while other network functions (such as network functions of the mobile core network) may be implemented at the base unit's primary processors. In one embodiment, all the network functions of the RCN may be run using one or more PHMs. For example, in some implementations a single PHM may run both the RAN (including the RF front end) and the core of the MPN, freeing the processors of the base unit for other tasks. In some implementations, separate PHMs may run the RAN and core functions, or the RAN function may be run on a PHM while the core is run on the base unit. NFs may be split across PHMs in other ways, for example with RAN NFs running on separate PHMs according to various Open RAN functional splits.

If a PHM which is being used for implementing a portion of an application is detached from the base unit, e.g., while the server remains powered on, the execution of that application may be terminated gracefully in at least some embodiments (e.g., the state of the application may be saved to persistent storage of the field-reconfigurable server). If a different PHM is then attached to the slot which was being used for the now-detached PHM, a second application implemented at least in part at the second PHM may be initiated in response to detection of the attachment of the second PHM. Multiple applications may be run concurrently at the field-reconfigurable server using respective PHMs in some embodiments.

As mentioned above, PHMs may be used to implement MPNs at PFHSs in at least some embodiments. MPNs are dedicated networks, typically set up and used on behalf of a particular organization or entity, that use licensed, shared, or unlicensed wireless spectrum and cellular infrastructure to transmit voice and data to and from UEs such as smart phones, Internet-of-Things (IoT) devices, embedded modules, and the like. MPNs are referred to as "non-public networks" by 3GPP (3rd Generation Partnership Project), a mobile telecommunications standards organization. An MPN can also be referred to as a private cellular network (PCN).

In embodiments in which a PHFS is used to implement an MPN, in addition to various layers of the MPN's radio-based communication network itself, the PHFS may also be used to run a suite of data processing applications (which can be referred to as edge applications) locally. Such applications may process or analyze sensor data or other contents of data payloads of the messages being transmitted via the MPN.

In various embodiments, a PHM may comprise specialized auxiliary processors, chip sets or other types of circuitry at which network functions of one or more layers of the radio-based communication network (e.g., the 5G stack or the 4G-LTE stack) used for an MPN are run. In some cases, multiple PHMs may be used together to implement an MPN, for example with some network functions of a RAN node being run at a first PHM attached to a PHFS, and other network functions of the RAN node being run at a second PHM attached to the same PHFS. A network function is a functional building block within a network infrastructure, which has well-defined external interfaces and a well-defined functional behavior. Network functions can be chained together in pipelines to form various kinds of radio-based communication networks, including MPNs. Network functions have historically been implemented as a physical network appliance or node; however network functions can be virtualized as well. Some PHFSs provided by the cloud provider network may implement a different combination of components of a radio-based communication network than others, with the specific PHFSs being selected depending on the requirements of the clients on whose behalf the servers are to be deployed.

Several different categories of PHFSs and PHMs can be provided by a cloud provider network operator, differing from one another in the computing capacity, memory and storage capacity, networking bandwidth, the type or vendor of specialized hardware components such as systems-on-chip (SOCs) used for network functions, and/or other properties. Clients of the cloud provider network can request custom combinations of data processing applications to be installed on the PHFSs (e.g., IoT device management applications, IoT data processing applications, machine learning applications and the like). At least some of these applications can implement application programming interfaces (APIs) compatible with one or more services of the cloud provider network (such as a machine learning service or an IoT device management service), and implement at least a subset of the functionality of such services while running in a local mode at a PHFS. If desired, a client can install (and/or request the cloud provider network operator to install) their own custom data processing applications on the PHFSs.

As mentioned above, PHFSs may be configured at least in part using resources of a cloud provider network in some embodiments. A cloud provider network (sometimes referred to simply as a "cloud" or a "cloud computing environment") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A cloud provider network can be formed as a number of regions, where a region is a separate geographical area in which the cloud provider clusters its primary data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, or a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a local zone may have substantial capacity, for example thousands of racks or more. Some local zones may use similar infrastructure as typical cloud provider data centers.

In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network or as an extension resource group of a VCS (virtualized computing service) of the provider network. Some outposts may be integrated into communications networks, for example as a multi-edge cloud having physical infrastructure spread across telecommunication data centers, telecommunication aggregation sites, and/or telecommunication base stations within the telecommunication network. In the on-premise example, the limited capacity of the outpost may be available for use only be the customer who owns the premises (and any other accounts allowed by the customer). In the telecommunications example, the limited capacity of the outpost may be shared amongst a number of applications (e.g., games, virtual reality applications, healthcare applications) that send data to users of the telecommunications network.

An edge location can include data plane capacity controlled at least partly by a control plane of a nearby availability zone. As such, an availability zone group can include a "parent" availability zone and any "child" edge locations homed to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations. Thus, in the above examples, an edge location refers to an extension of at least data plane capacity that is positioned at the edge of the cloud provider network, close to customer devices, antennas or other telecommunication equipment, and/or workloads.

As mentioned above, some cloud provider networks may provide support for local zones, a type of infrastructure deployment that places some of the provider network's compute, storage, database, and other select services close to large population, industry, and IT centers or other desired locations which may not be very near the provider network's primary data centers. With such local zones, applications that need single-digit millisecond latency can be run closer to end-users in a specific geography. Local zones provide a high-bandwidth, secure connection between local workloads and those running in a provider network region, allowing provider network clients to seamlessly connect to their other workloads running in the region and to the full range of in-region services through the same APIs and tool sets. In some embodiments, at least a portion of an MPN may be implemented using provider network resources deployed at edge locations and/or local zones.

The cloud provider network may implement various computing resources or services, which may include a VCS, a radio-based communication network management service (RCNMS), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

Various network-accessible services may be implemented at one or more data centers of the provider network in different embodiments. Network-accessible computing services can include an elastic compute cloud service (referred to in various implementations as an elastic compute service, a virtual machines service, a computing cloud service, a compute engine, a VCS or a cloud compute service). This service may offer virtual compute instances (also referred to as virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances may correspond to one of several instance types or families. An instance type may be characterized by its hardware type, computational resources (e.g., number, type, and configuration of central processing units [CPUs] or CPU cores, hardware accelerators for various tasks), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as being a "burstable" instance type that has a baseline performance guarantee and the ability to periodically burst above that baseline, a non-burstable or dedicated instance type that is allotted and guaranteed a fixed quantity of resources, or an instance type optimized for radio-based communication networks). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on. In some embodiments, PHFSs may run one or more compute instances, which may be used to execute edge user data processing applications and/or some MPN network functions.

The computing services of a provider network can also include a container orchestration and management service (referred to in various implementations as a container service, cloud container service, container engine, or container cloud service). A container represents a logical packaging of a software application that abstracts the application from the computing environment in which the application is executed. For example, a containerized version of a software application includes the software code and any dependencies used by the code such that the application can be executed consistently on any infrastructure hosting a suitable container engine (e.g., the Docker® or Kubernetes® container engine). Compared to virtual machines (VMs), which emulate an entire computer system, containers virtualize at the operating system level and thus typically represent a more lightweight package for running an application on a host computing system. Existing software applications can be "containerized" by packaging the software application in an appropriate manner and generating other artifacts (e.g., a container image, container file, or other configurations) used to enable the application to run in a container engine. A container engine can run on a virtual machine instance in some implementations, with the virtual machine instance selected based at least partly on the described network performance metrics. MPN components may be run using containers at the PHFSs in at least some embodiments. Other types of network-accessible services, such as packet processing services, database services, wide area networking (WAN) services and the like may also be implemented at the cloud provider network in some embodiments.

The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information management). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks. In some embodiments, while operating in cloud-disconnected mode, a subset of control plane functionality of one or more cloud-based services may be implemented locally at the PHFS, thereby enabling data plane operations of such services to be executed at the PHFS without communication with the data centers of the cloud provider network at which the control plane operations of the services are typically performed when connectivity to the cloud is available.

FIG. 1 illustrates an example system environment in which portable hardened field-reconfigurable servers of a cloud provider network may be utilized for mobile private networks and other applications run in a cloud-disconnected mode, according to at least some embodiments. As shown, system 100 may include resources and artifacts of several network-accessible services of cloud provider network 101, including a radio-based communication network management service (RCNMS) 110, a VCS 192, an Internet-of-Things (IoT) device management service (IDMS) 182, a storage service 185, and a machine learning service (MLS) 188. The RCNMS may offer its clients several categories of field-reconfigurable servers that can be used to implement a variety of applications including RCNs such as MPNs in the depicted embodiment, e.g., with portions of the applications being executed at PHMs also offered by the RCNMS. A given field-reconfigurable server may comprise a base unit of a particular category selected by an RCNMS client (such as an administrator or owner of an MPN) from a base unit catalog 106 maintained by the RCNMS, as well as one or more pluggable hardware modules (PHMs) of PHM categories selected from a PHM catalog 105 in the depicted embodiment.

Using their preferred combinations of base units and PHMs, RCNMS clients may in effect obtain custom portable hardened field-reconfigurable servers (PHFSs) for deployment in a variety of deployment environments external to the cloud provider network's data centers in the depicted embodiment. A given deployment environment may comprise a set of physical locations or an area within which MPN functionality is desired at least temporarily, e.g., after an event such as a hurricane or a wildfire. The PHFSs may be used to run MPNs and/or other applications in deployment environments with different levels of connectivity to the cloud computing environment. A given PHFS may for example be used to implement an MPN while the PHFS does not have connectivity to the cloud provider network; this mode of operation may be referred to as cloud-disconnected mode (CDM). Applications such as MPNs may also be run in cloud-connected mode (CCM) at the PHFSs, i.e., during time periods in which connectivity is available to the cloud provider network, e.g., because of proximity to IP networking infrastructure such as fiber optics or cable lines, and/or proximity to cell towers and the like. Four examples of deployment environments are shown in FIG. 1.

In deployment environment 154, a PHFS 155A (with an attached PHM at which RAN network functions are run) is utilized to run an MPN in cloud-disconnected mode. Such PHMs may be referred to as RAN PHMs or RAN network function execution modules. User equipment devices (UEs) 156A-156K of the MPN, such as cell phones or IoT devices, may communicate with PHFS 155A in the depicted example. In deployment environment 157, a PHFS 155B operating in CDM may be moved from location A to location B while continuing to process messages from/to UEs such as UE 156L or 156Q. For example, PHFS 155B may be transported in a backpack worn by a first responder, or transported by a robot or drone device while continuing to implement its MPN functions. In deployment environment 158, PHFS 155C may run in CCM, servicing messages to/from UEs 156R and 156T while communicating with the RCNMS and/or other services of the cloud provider network as needed via one or more network paths 177. For example, the network paths 177 may be used to transmit metrics collected at PHFS 155C (either while PHFS 155C was operating in CCM or in CDM) with respect to an RCN implemented at PHFS 155C.

In deployment environments 154, 157 and 158, a single PHFS may be used to implement an MPN. In contrast, in deployment environment 159, a plurality of PHFSs such as PHFS 155D and PHFS 155E operating in CDM may be used together for implementing an MPN that processes messages from UEs such as UE 156U and UE 156Z. Any of several approaches may be taken towards configuring multiple PHFSs for a single MPN in different embodiments. For example, in some embodiments, one PHFS such as 155D may be designated as the primary PHFS for an MPN, while another PHFS such as 155E may be designated at least temporarily as a secondary PHFS for that MPN. During time intervals in which both the primary and secondary PHFSs are up and running, the primary PHFS may be used to run all the network functions needed for a set of UEs, and state information pertaining to the UEs' communication sessions may be replicated from the primary to the secondary PHFS periodically or based on various threshold conditions. The UEs may be provided with information indicating that PHFS 155E is available for communication in some embodiments. The replication of the state information may enable PHFS 155E to take over the processing of the in-progress UE communication sessions quickly in the event of a failure of the primary PHFS. The MPN workload being processed earlier at the primary PHFS may be migrated to the secondary PHFS in such a scenario, with the secondary PHFS being designated as the new primary PHFS. Another PHFS (if available) may be designated as the new secondary, or the original primary PHFS may be designated as the current secondary PHFS if it recovers from its failure and is able to communicate with the new primary. In another approach to multiple-PHFS MPNs, traffic of a respective subset of UEs may be processed at a given PHFS, thereby reducing the workload level of individual PHFSs. Other approaches for distributed implementation of MPNs using multiple PHFSs may be used in some embodiments.

The control plane 111 of the RCNMS may include a set of field-reconfigurable server managers (FSMs) 102 in the depicted embodiment, responsible for example for preparatory configuration tasks such as installing virtualization managers that can launch compute instances at the PHFSs without communicating with the control plane, transmitting unlocking instructions for the PHFSs to administrators of the servers, and so on. The RCNMS may also include a set of cloud-based network function executors 171 in some embodiments, which can potentially optionally be used to implement a subset of network functions (e.g., mobile core network functions) of RCNs during time intervals in which PHFSs (at which other subsets of the network functions are run locally) have connectivity to the cloud provider network.

The RCNMS may include an edge application library 120 in some embodiments, comprising a variety of applications for processing data payloads of RCN messages which can be executed on PHFSs locally. The edge application library may include a set of provider network service applications 122 and customized client-provided applications 124 in the depicted embodiment. The provider network service applications may provide similar functionality to a set of cloud-based services (such as MLS 188, IDMS 182, storage service 185 and the like) and implement the same APIs as the cloud-based services, but may be run at a PHFS without communication with the cloud provider network. Customized client-provided applications may implement data processing logic designed by clients, and may not necessarily support APIs of provider network services. In at least some embodiments, a set of applications from the edge application library may be installed at a PHFS base unit at the cloud provider network before the PHFS base unit is transported to the MPN target location, e.g., based on requirements or preferences provided by RCNMS clients via programmatic interfaces.

The VCS 192 may comprise a plurality of virtualization hosts 193, at which compute instances 194 may be launched at the request of clients. Such compute instances or virtual machines may for example be used to run applications on behalf of RCNMS clients. During periods in which PHFSs have connectivity to the cloud provider network, the PHFSs may communicate with the cloud-based compute instances to (for example) transfer application data or results in one or both directions. IDMS 182 may comprise one or more IoT fleet managers 183, which may be used (e.g., instead of or in addition to using local versions of the fleet managers deployed from edge application library 120 at the PHFSs) by the PHFSs during periods when connectivity to the cloud is available. Storage servers 186 of storage service 185 may be used, for example, to transfer data and/or metrics collected at the PHFSs when connectivity is available between the PHFSs and the storage service. Machine learning models trained by model training coordinators 189 of MLS 188 may be deployed at PHFSs for execution in CDM in some embodiments. When connectivity is available to the MLS, additional training data (e.g., data collected from IoT sensor UEs) available at a PHFS may be transmitted to the MLS from the PHFS. Model execution coordinators 190 may be used to execute the trained versions of the models on data collected at PHFSs in various embodiments.

In various embodiments, an enclosure of a base unit of a PHFS may include one or more externally-accessible slots to which respective PHMs can be attached in deployment environments with minimal effort, e.g., without requiring any disassembly or reassembly of the enclosure or the base unit. A PHFS may have an attached or built-in antenna in some embodiments for receiving and/or transmitting radio frequency signals. The base unit may comprise a set of primary processors and a memory at which program instructions may be stored. The program instructions may for example implement a configuration manager of the PHFS, which detects attachment of a PHM such as a pluggable RAN module via one of the slots. In response to determining that the PHM satisfies a security criterion, a configuration manager may launch one or more programs at the base unit to implement one or more additional network functions (such as mobile core network functions) which may not be executed at the PHM itself in some embodiments. After the security criterion is satisfied, messages of an MPN may be processed via network functions executed at the PHM and at the base unit in various embodiments. For example, a first set of network functions may be executed at the PHM when a message from a UE is received via the antenna at the PHFS, and output of the first set of network functions may be consumed as input by a second set of network functions executed at a primary processor of the base unit.

As indicated in deployment environment 157, messages of a given communication session may be processed at a PHFS while the PHFS is in motion in various embodiments; as such, there may be no requirement that a PHFS has to remain stationary in order to execute MPN network functions or other applications. A given PHM that is currently being used to implement an MPN may be dynamically detached from its slot and replaced by another PHM if desired. The other PHM may, for example, support a different performance level (e.g., a lower or higher rate of processing UE messages) than the one that was detached, or a different set of network functions than the one that was detached. Multiple PHMs implementing distinct applications may be attached concurrently to a PHFS in some embodiments—for example, a first PHM may implement RAN network functions for an MPN, a second PHM may be used to analyze data collected via the messages of the MPN, and so on. Any of a variety of physical interfaces may be used for communication between a PHM and a base unit in different embodiments, such as one or more PCIe interfaces and/or one or more USB interfaces. Some PHMs may use both PCIe and USB concurrently to communicate with the base unit. Compute instances may be launched at the base unit to implement some network functions of an MPN, and/or to run other applications in behalf of the RCNMS client for whom the PHFS is configured.

In various embodiments, a multi-step workflow may be implemented, e.g., by a configuration manager of a PHFS running at the PHFS base unit's primary processors, to ensure that PHMs attached to the base unit satisfy security criteria. Metadata associated with a set of approved PHMs may be stored in an encrypted read-write portion of boot media of the PHFS in some embodiments, e.g., in response to input provided via a programmatic interface by an administrator of the PHFS before the PHFS is deployed for use. The configuration manager may detect when a particular PHM is attached to the base unit via one of the slots of the enclosure of the base unit, and verify, using the metadata, that the PHM belongs to an acceptable category of PHMs. The configuration manager may then obtain a digital certificate or similar security artifact from the newly-attached PHM in at least some embodiments. Another security artifact stored in the metadata, such as a public key associated with the PHM or the category to which the PHM belongs, may be used to validate the digital certificate. If the digital certificate is validated, a compute instance to be used to communicate with the PHM may be launched by the configuration manager, e.g., using a machine image included in the metadata in various embodiments. The PHM may in some embodiments be mounted, e.g., as a device that can be accessed by programs running within the compute instance, using mounting configuration information which is also included in the metadata. Programs running within the compute instance may thereby be able to access application data from the PHM.

If/when the PHM is detached from its slot (which may happen while the base unit remains powered on), state information of the application that was being run using the PHM may be saved, e.g., at local storage of the base unit in some embodiments. In one embodiment, the compute instance used for the PHM may be terminated when the PHM is detached. The same slot may be used, if desired, to attach a PHM of a different category; a similar workflow involving the use of metadata pertaining to that category may be employed to start up a different application. The original PHM (which was detached) may be re-attached to the base unit in various embodiments, using the same slot or a different slot, if resumption of execution of the application for which the original PHM was being used is desired. The saved state information may be used to resume functionality of such an application in at least one embodiment. In some embodiments, after a multi-step security compliance workflow of the kind described above has been executed for a given PHM, one or more of the steps of the workflow may not have to be repeated each time that particular PHM is re-attached to the base unit. Instead, for example, a unique identifier of the PHM and a corresponding "security verified" flag may be stored at the base unit, and one or more steps of the workflow may not be performed.

The metadata pertaining to approved PHMs may be exported from one PHFS (e.g., in response to a programmatic request), with a copy of the metadata being saved as a file or other object, and imported at another PHFS in some embodiments, enabling the same kinds of PHMs to be used at several PHFSs without step-by-step re-entry of the metadata at each PHFS. Portions of the metadata may be deleted from a PHFS in response to programmatic requests in one embodiment, thereby preventing subsequent use at that PHFS of selected PHMs whose metadata is removed. An administrator or end user may view a portion of the metadata, such as a list of acceptable PHMs, via a programmatic interface in some embodiments. Any of a variety of PHM categories may be designated as acceptable for a given PHFS in some embodiments, such as PHMs that implement (a) a portion of a radio-based communication network, (b) analysis of signals received from Internet-of-Things sensors, (c) execution of a machine learning model, or (d) a task of a search-and-rescue operation.

In some embodiments, a control plane server run at a data center of the cloud provider network, such as an FSM, may transmit PHFS unlocking metadata to an administrator of one or more PHFSs via programmatic interfaces. In addition, instructions or guidelines indicating how the unlocking metadata is to be propagated or stored at various radio-equipped devices to enable unlocking of the PHFSs in the field while the PHFSs do not have access to the cloud provider network may also be provided to the administrator. The administrator may then use the instructions to store the unlocking metadata (or cause the unlocking metadata to be stored) at a set of radio-equipped devices, such as devices similar to tactical radios, that are provided to trusted end users of the PHFS, such as a group of first responders.

During a time period in which (a) connectivity is unavailable between the PHFS and the data centers of the cloud provider network and (b) the PHFS is in a locked state, a configuration manager running at the PHFS may detect that a radio message has been received at the PHFS. Execution of one or more applications implemented with the help of PHMs may be prohibited at the PHFS while the PHFS remains in the locked state. If the configuration manager is able to determine that content of the radio message were generated using the unlocking metadata, the PHFS may be unlocked, and an application such as an MPN may be started up at the PHFS, e.g., with some subset of the application functionality being executed at a PHM.

Note that the radio-message-based unlocking technique described above is not restricted to PHFSs that implement any particular kind of application or to PHFSs that necessarily utilize PHMs. Such a radio-message-based unlocking technique may be employed for any type of server that has to be unlocked in an environment in which connectivity via other channels of communication than radio messages is restricted, or even in environments in which connectivity via such channels is available.

In some embodiments, instead of or in addition to requiring that the radio message comprises content generated using the unlocking metadata, other criteria associated with the unlocking metadata may be used to determine whether the PHFS should be unlocked. For example, the metadata may include an expiration time, and the PHFS may only be unlocked if that expiration time has not yet been reached in some embodiments. In some embodiments, the radio message may comprise a cryptographic string or other artifact assigned to the radio-equipped device by the administrator, and the configuration manager may be able to verify whether the artifact is among an acceptable set of artifacts.

An RCNMS 110 is one example of a provider network service from which clients may obtain field-reconfigurable servers such as PHFSs 155. In some embodiments, field-reconfigurable servers (and associated PHMs) may be provided to clients by other provider network services, such as the VCS 192. In at least one embodiment, a field-reconfigurable server may be used by a client exclusively for applications that are not RCNs.

Figure 2:
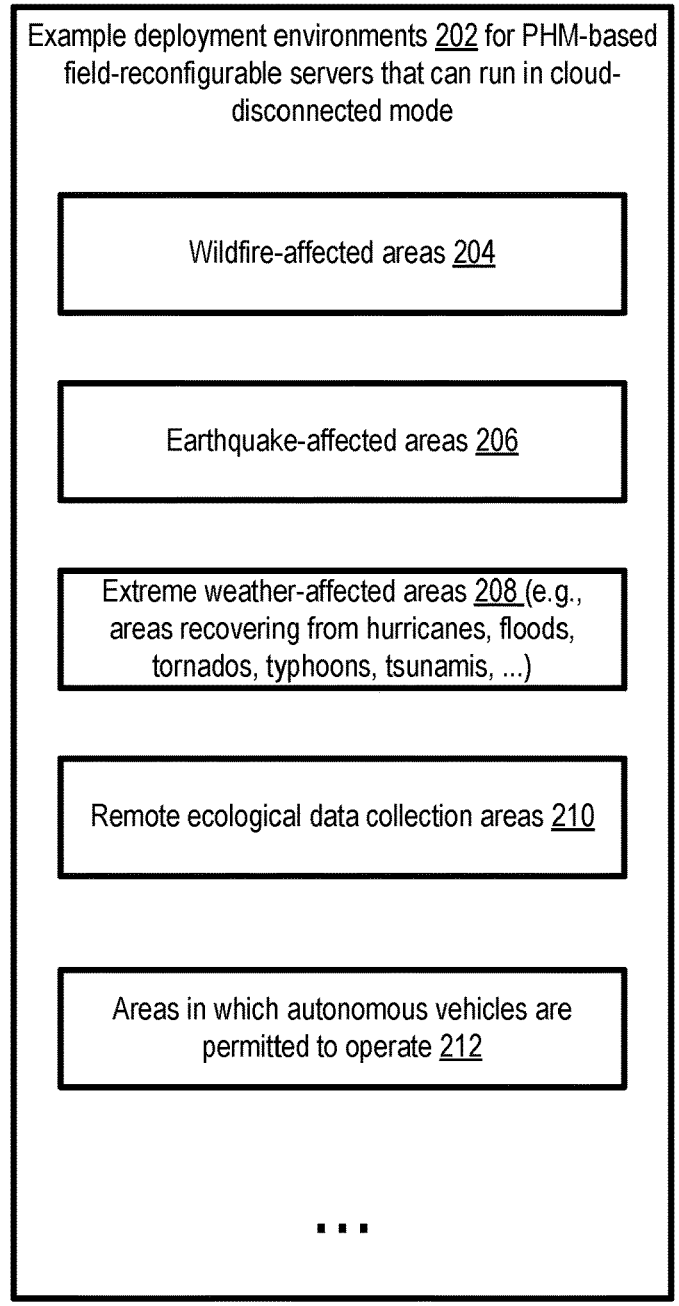
FIG. 2 illustrates example deployment environments in which portable field-reconfigurable servers may be used, according to at least some embodiments.

PHFSs may be deployed at various types of deployment environments in different embodiments. FIG. 2 illustrates example deployment environments in which portable field-reconfigurable servers may be used, according to at least some embodiments. Example deployment environments 202 for PHM-based field-reconfigurable servers that can run in cloud-disconnected mode may include wildfire-affected areas 204, earthquake-affected areas 206, as well as extreme weather-affected areas 208. The weather-affected areas may include areas recovering from hurricanes, floods, tornados, typhoons, tsunamis and the like.

The field-reconfigurable servers may also be deployed at remote ecological data collection areas 210 in some embodiments, such as areas in the arctic or Antarctica, tropical jungles, and the like. In at least one embodiment, such servers may be deployed within autonomous vehicles in areas 212 in which such vehicles are permitted to operate, e.g., to enable vehicle-to-vehicle communication. In some embodiments, the servers may be deployed to rovers or other equipment used for exploration of ocean floors, exploration of planets other than Earth, or exploration of other bodies in space such as asteroids.

Figure 3:
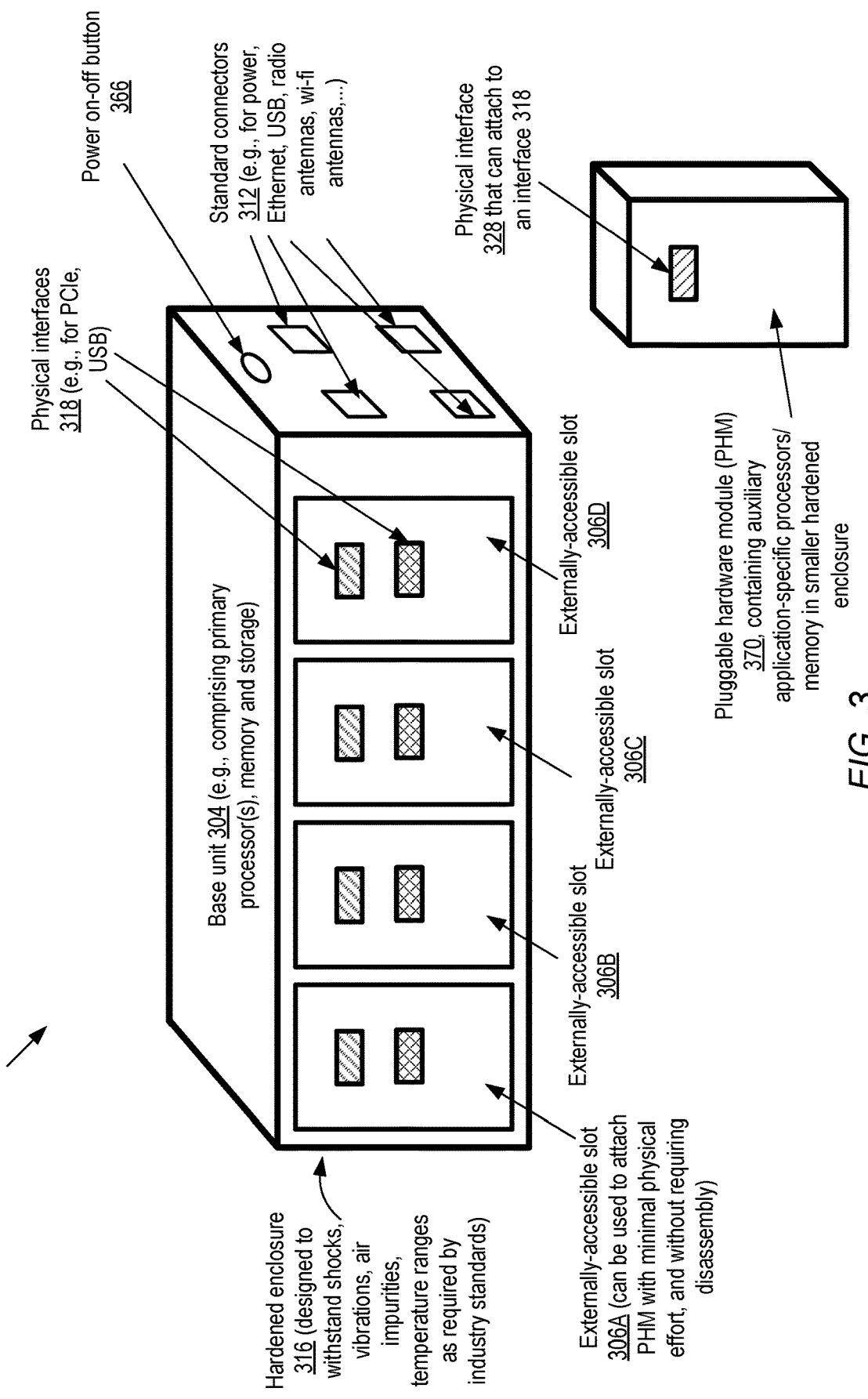
FIG. 3 illustrates a base unit and a pluggable hardware module of an example field-reconfigurable server, according to at least some embodiments.

FIG. 3 illustrates a base unit and a pluggable hardware module of an example field-reconfigurable server, according to at least some embodiments. PHM-detached view 302 of a PHFS, similar in features and functionality to the PHFSs 155 discussed in the context of FIG. 1, comprises a base unit 304 to which one or more PHMs such as PHM 370 can be attached via externally-accessible slots in the depicted embodiment. The base unit 304 may comprise a set of primary processors, memory and storage within a hardened enclosure 316 (e.g., an enclosure constructed of reinforced metal or alloys). The enclosure 316 may be designed and tested to withstand substantial shocks, vibrations, air impurities and temperature ranges in some embodiments. In at least some embodiments, the enclosure (and the PHFS as a whole) may comply with at least a subset of requirements of an industry standard for ruggedness of computer systems, similar to the MIL-STD-810G specification. In at least some embodiments, a cloud provider network from which a PHFS may be acquired by clients may provide results of computer ruggedness tests that the PHFS has passed to clients via programmatic interfaces upon request.

The hardened enclosure 316 of base unit 304 may include four externally-accessible slots 306A, 306B, 306C and 306D in the depicted embodiment. Each such slot may be used to attach a PHM with minimal physical effort or force, e.g., by sliding the PHM into a position in which the PHM's physical interfaces for data transfer come into contact with corresponding physical interfaces 318 of the slots, and in which an indentation along the slot boundary comes into contact with a corresponding protrusion in an exterior face of the PHM (or, alternatively, a protrusion along the slot boundary comes into contact with an indentation in the exterior face of the PHM). In one embodiment, a given slot may comprise one or more PCIe physical interfaces or connectors, and/or one or more USB physical interfaces or connectors. A given PHM may use one or more of the physical interfaces of a slot—e.g., some PHMs like PHM 370 may use only one type of physical interface 328, while other PHMs may use multiple types of physical interfaces concurrently to transfer data and/or instructions to a base unit. In some embodiments, the slots may be uniform in width and height; in other embodiments, some slots may be wider or taller than others. In one embodiment, each slot may have the same number and types of physical interfaces 318; in other embodiments, the number and/or types of physical interfaces may differ from one slot to another. In some embodiments, a given PHM may occupy a single slot; in other embodiments, one PHM may be attached to the base unit using multiple slots. In some embodiments, externally-accessible slots for attaching PHMs may be located on one external face of the enclosure 316, and not on other faces. In other embodiments, externally-accessible slots may be located on multiple faces of the enclosure.

The base unit may have a power on-off button 366 as well as a set of standard connectors 312 for power, Ethernet connectivity (or connectivity via other types of cables), radio antennas, wi-fi antennas and the like. In some embodiments, power may be obtained at the base unit from an external battery via one of the standard connectors. In other embodiments, a battery may be included in the base unit. One of the standard connectors 312 may be usable obtain power from AC outlets in some embodiments. In one embodiment, the base unit may provide power to a PHM, e.g., via additional physical interfaces than those used for transferring data, or using a physical interface that can be used for data transfers as well as power. In another embodiment, at least some PHMs may use batteries or other sources of power and may not require power from the base unit. As mentioned earlier, at least some PHMs may be hot-pluggable or hot-swappable in various embodiments—that is, such PHMs can be attached to or detached from a base unit of a PHFS without requiring stopping, shutting down or rebooting/restarting the base unit (or any programs or systems software running at the base unit). A hot-swappable PHM attached to a PHFS may be replaced quickly in the field by another PHM with very little physical effort, so that a different PHM-supported application (or the same application but with a different performance level) can be quickly started up.

In at least some embodiments, even after the maximum number of PHMs that can be attached to a base unit have been attached, the PHFS may be compact and light enough to be carried around in a backpack while remaining operational, e.g., by a person of average strength. In one such embodiment, a provider network service may provide not just the base unit and a desired set of PHMs to a client, but may also provide a backpack or other similar wearable container for the PHFS to the client. A PHFS may be carried or transported, while remaining operational, by a robot or drone in one embodiment. PHFSs may be used to implement applications such as MPNs while stationary, as well as while being moved or transported in various embodiments. It is noted that in some embodiments, base units and/or PHMs may have different shapes than those shown in FIG. 3 (e.g., some PHMs and/or the base unit may be cylindrical, or a PHM or base unit enclosure may have curved edges). In some embodiments, some base units and/or PHMs may not be enclosed within the same kinds of enclosures (with respect to the ability of the enclosures to withstand extreme environments) as others—for example, one version of a PHFS provided by a cloud provider network service may use off-the-shelf enclosure material similar to that used for conventional personal computers or desktops.

Figure 4:
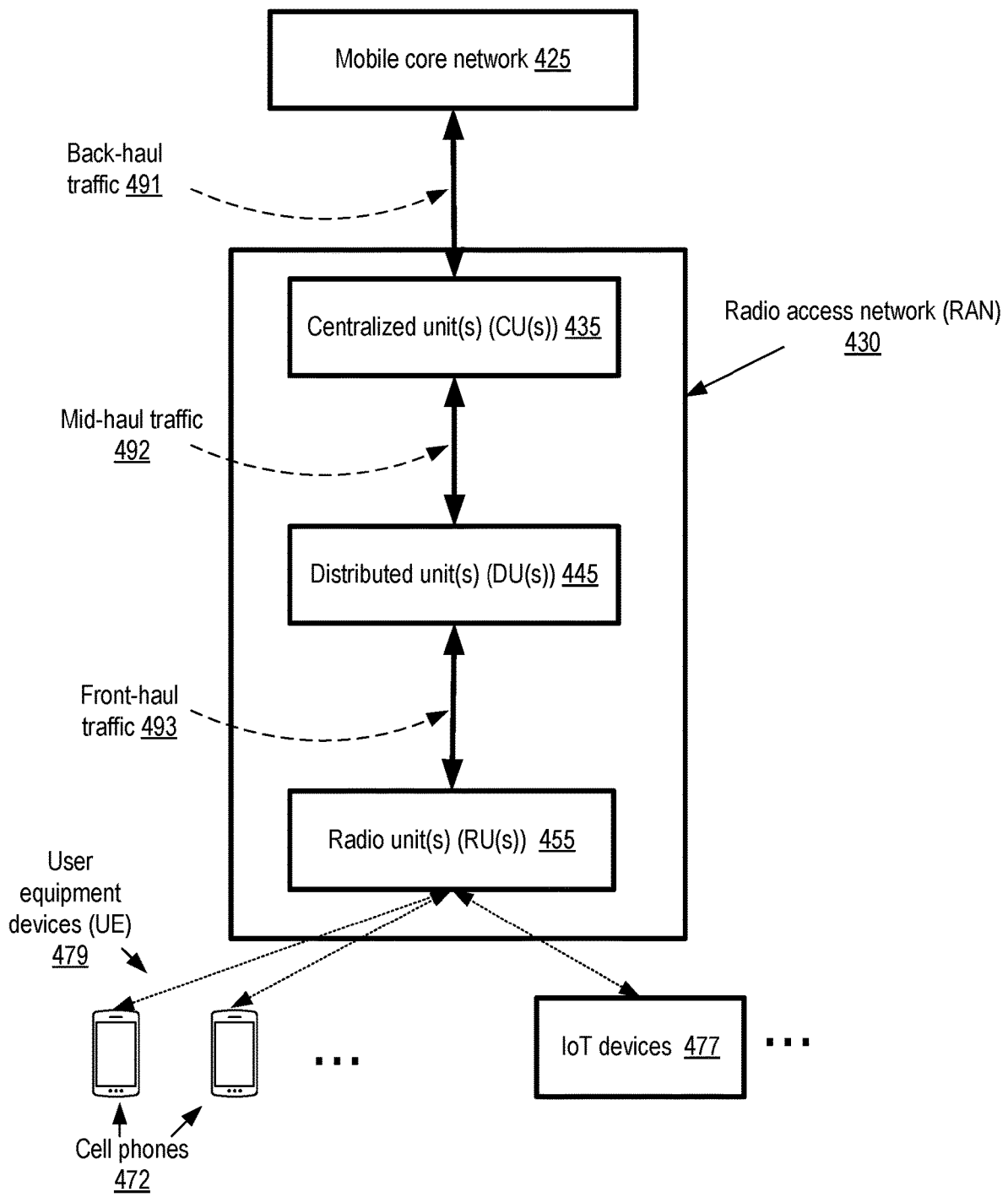
FIG. 4 illustrates example components of a radio-based communication network, which may be implemented using field-reconfigurable servers, according to at least some embodiments.

In various embodiments, as mentioned above, a PHFS may be used to implement radio-based communication networks such as MPNs. FIG. 4 illustrates example components of a radio-based communication network, which may be implemented using field-reconfigurable servers, according to at least some embodiments. In the depicted embodiment, a mobile core network 425 of an RCN may implement a set of back-end functions associated with radio-based communication networks. Network functions performed at the mobile core network (referred to as core network functions) may for example include functions to aggregate data traffic from end user devices, authenticate subscribers/users, apply personalized policies, and/or manage the mobility of devices.

The mobile core network may be connected to one or more centralized units (CUs) 435 of a radio access network (RAN) 430. The traffic between the mobile core network and the CUs 435 may be referred to as back-haul traffic 491 in the depicted embodiment. A given CU may in turn be connected to one or more distributed unite (DUs) 445 of the RAN, and a given DU may be connected to one or more radio units (RUs) 455 of the RAN. A combination of one or more CUs, one or more DUs and one or more RUs being used for a given RCN such as an MPN may be referred to collectively as a RAN node in some embodiments. A given RU may receive RCN messages from (and transmit RCN messages to) some number of user equipment (UE) devices 479, such as cell phones 472, IoT devices 477 and the like using radio antennas. The traffic between CUs and DUs may be referred to as mid-haul traffic 492, while the traffic between DUs and RUs may be referred to as front-haul traffic 493.

The mappings between the various RCN layers shown in FIG. 4, and the specific devices or servers at which the layers are implemented for a given RCN, may in general vary. In some embodiments, all the layers (e.g., the RU, DU, CU and the mobile core network) may be implemented at a single PHFS or a small number of collaborating PHFSs in a given deployment environment. Within such a single server at which numerous layers of the radio-based communication network are co-located, different combinations of the layers' functionality may be implemented using general-purpose processors such as CPUs than are implemented using PHMs with special-purpose chipsets in various embodiments. One of the advantages of co-locating the RU, DU, CU and mobile core network functions on a single PHFS is that very low latencies may be achieved for front-haul, mid-haul, and back-haul messages. In some embodiments, during time intervals in which a PHFS has connectivity to a cloud provider network, a subset of the network functions (e.g., functions of the mobile core network, and/or CUs) may be implemented at the cloud provider network instead of at the PHFS itself.

Figure 5:
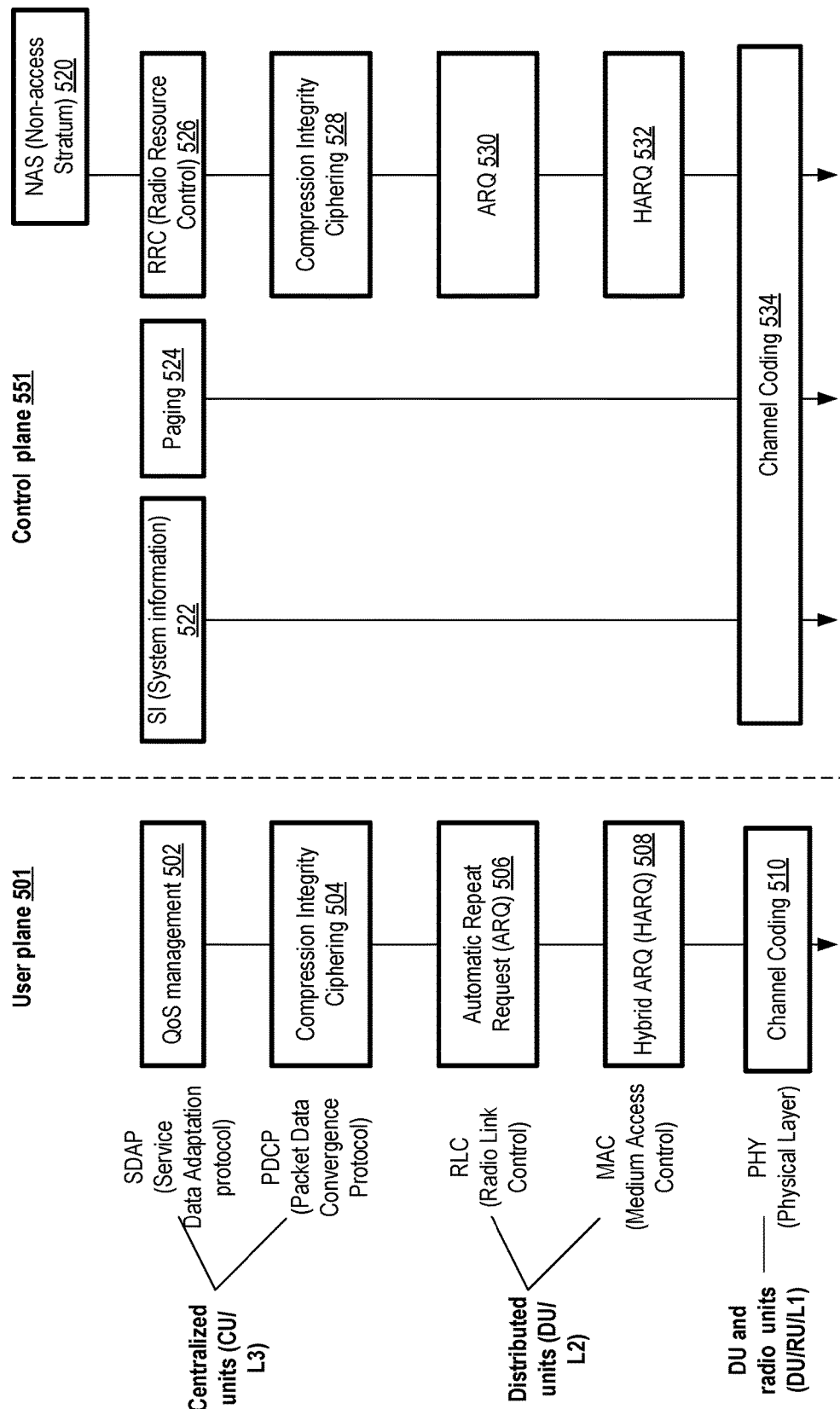
FIG. 5 illustrates an example downlink pipeline of radio access network (RAN) network functions for radio-based communication networks, according to at least some embodiments.

FIG. 5 illustrates an example downlink pipeline of radio access network (RAN) network functions for radio-based communication networks, according to at least some embodiments. The arrows shown in FIG. 5 represent the downlink communication path (from the higher levels of the standard, which may be implemented using primary processors of a PHFS's base unit, downwards to the lower levels which may be implemented using PHMs). The depicted layers conform to a 5G-NR (Fifth Generation—New Radio) standard published by 3GPP; similar layers are also defined for other generations of cellular communication technology.

In a manner somewhat analogous to the subdivision, discussed above, of a provider network functionality into control plane and data plane functionality, the operations needed for RCNs are divided into control plane operations and user plane operations. Control plane operations include connection configuration and other administrative tasks such as monitoring, while user plane operations involve transmission of user data using IP packets. Contents of control plane messages may indicate changes to RCN application state, and the state information thus obtained and updated may be used to process user plane messages.

The 5G-NR protocol stack comprises three layers, referred to as L1 (layer 1), L2 (layer 2) and L3 (layer 3). Standardized interfaces for communications between the layers (and between sub-layers of individual layers) have been defined; this allows network functions of the layers and sub-layers to be mapped flexibly to different hardware and/or software components as long as the interfaces and performance requirements of the protocol stack can be met. Logic for executing the functionality of the layers is distributed among three types of components: CUs for L3 operations, DUs for L2 operations and optionally for some L1 operations, and RUs used for at least a subset of L1 operations. L1 is also referred to as the physical layer (PHY). L2 comprises the MAC (Medium Access Control) and RLC (Radio Link Control) sub-layers. L3 may include sub-layers for PDCP (Packet Data Convergence Protocol) and SDAP (Service Data Adaptation Protocol). Operations of user plane 501 may include quality of service (QoS) Management 502 and Compression Integrity Ciphering 504 in L3, Automatic Repeat Request (ARQ) processing 506 and Hybrid ARQ (HARQ) processing 508 in L2, and Channel Coding 510 at the PHY layer. Operations of control plane 551 may include Non-access Stratum (NAS) 520 protocol tasks, System Information (SI) 522 tasks, Paging 524, Radio Resource Control (RRC) 526 and Compression Integrity Ciphering 528 in L3, ARQ 530 and HARQ 532 in L2, and Channel Coding 534 in the PHY layer. Various ones of the layers and protocols shown in FIG. 5 may comprise the execution of respective sets of network functions. In at least some embodiments, a subset of the network functions corresponding to L1, L2 and/or L3 may be implemented using PHMs of the kind introduced above. In at least one embodiment, a subset of the network functions corresponding to L1, L2 and/or L3 may be implemented at compute instances or software containers at PHFSs.

Figure 6:
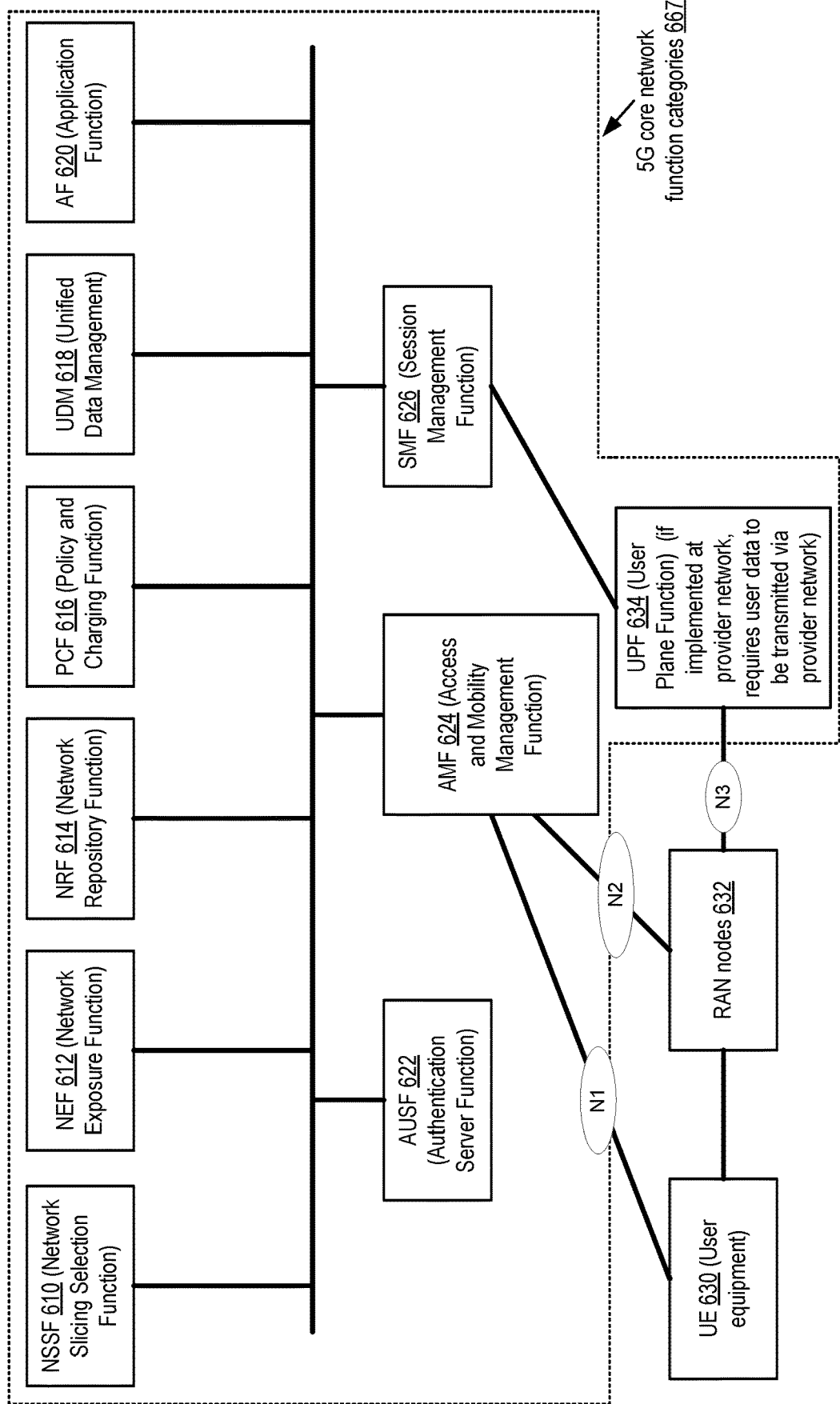
FIG. 6 illustrates example network functions which may be performed across mobile network user plane and control plane end to end, according to at least some embodiments.

FIG. 6 illustrates example network functions which may be performed across mobile network user plane and control plane end to end, according to at least some embodiments.

The components shown in FIG. 6 correspond to a reference architecture for a version of a 3GPP 5G system released by ETSI (the European Telecommunications Standards Institute). Note that the techniques for implementing RCNs using PHFSs of the kind introduced in this document may be used with other architectures and other combinations of network functions, and is not restricted to the particular architectures and layers shown in FIG. 4, FIG. 5, and FIG. 6.

5G mobile core network function categories 667 in the depicted embodiment may include AMF 624 (Access and Mobility Management), UPF 634 (User Plane Function), NSSF 610 (Network Slicing Selection Function), NEF 612 (Network Exposure Function), NRF 614 (Network Repository Function), PCF 616 (Policy and Charging Function), UDM (Unified Data Management) 618, AF (Application Function) 620, AUSF 622 (Authentication Server Function) and SMF 626 (Session Management Function). The details of the kinds of operations expected to be performed by the network functions of the different network function categories, and the interfaces to be used for communications between the different categories of mobile core network functions, are provided in 5G-related standards documents. With respect to the communications between RAN nodes 632 and the mobile core network functions, two interfaces are defined in the standard: an interface referred to as N2 for control plane messages, and an interface referred to as N3 for user plane messages.

Control plane messages from a RAN node (e.g., from a CU of the RAN node) that are to be sent to the mobile core network may be sent via the N2 interface to an AMF 624 in the depicted embodiment. Depending on the kind of control plane message, the AMF may then initiate various operations, which in some cases may involve intra-core-network messages between the AMF and other mobile core network functions. The AMF may also send control plane message responses to the RAN node via the N2 interface. An AMF thus serves as a mobile core network control plane access endpoint in at least some embodiments. In at least some implementations, control plane messages from user equipment (UE) 630 (such as cell phones, IoT devices, etc.), which can be transmitted to AMFs directly via an interface referred to as N1, may instead be sent to RAN nodes and from the RAN nodes to the AMFs using the N2 interface.

User plane messages from a RAN node 632 that are to be sent to the mobile core network may be sent via the N3 interface to a UPF 634 in the depicted embodiment. At least in some cases, the contents of the user plane messages may originate at user equipment (UE) 630, and may have to be sent to some destination via a data network (DN) or via a receiving-side RAN node. In scenarios in which a PHFS has network connectivity, the DN may for example comprise portions of a public network (such as the public Internet) and/or one or more private networks. The UPF may coordinate the transfer of the user plane message contents; responses to the user plane messages may be received by a UPF from the destinations and passed on to the UEs 630 via the RAN node. A UPF thus serves as a mobile core network user plane access endpoint in at least some embodiments. In at least some embodiments, all the mobile core network functions shown in FIG. 6 may be implemented, e.g., within one or more compute instances, at a PHFS or a set of PHFSs configured to work together in a deployment environment. In one embodiment, some of the mobile core network functions may instead be executed at resources of a cloud computing environment during time period in which sustained connectivity to the cloud data centers is available.

Figure 7:
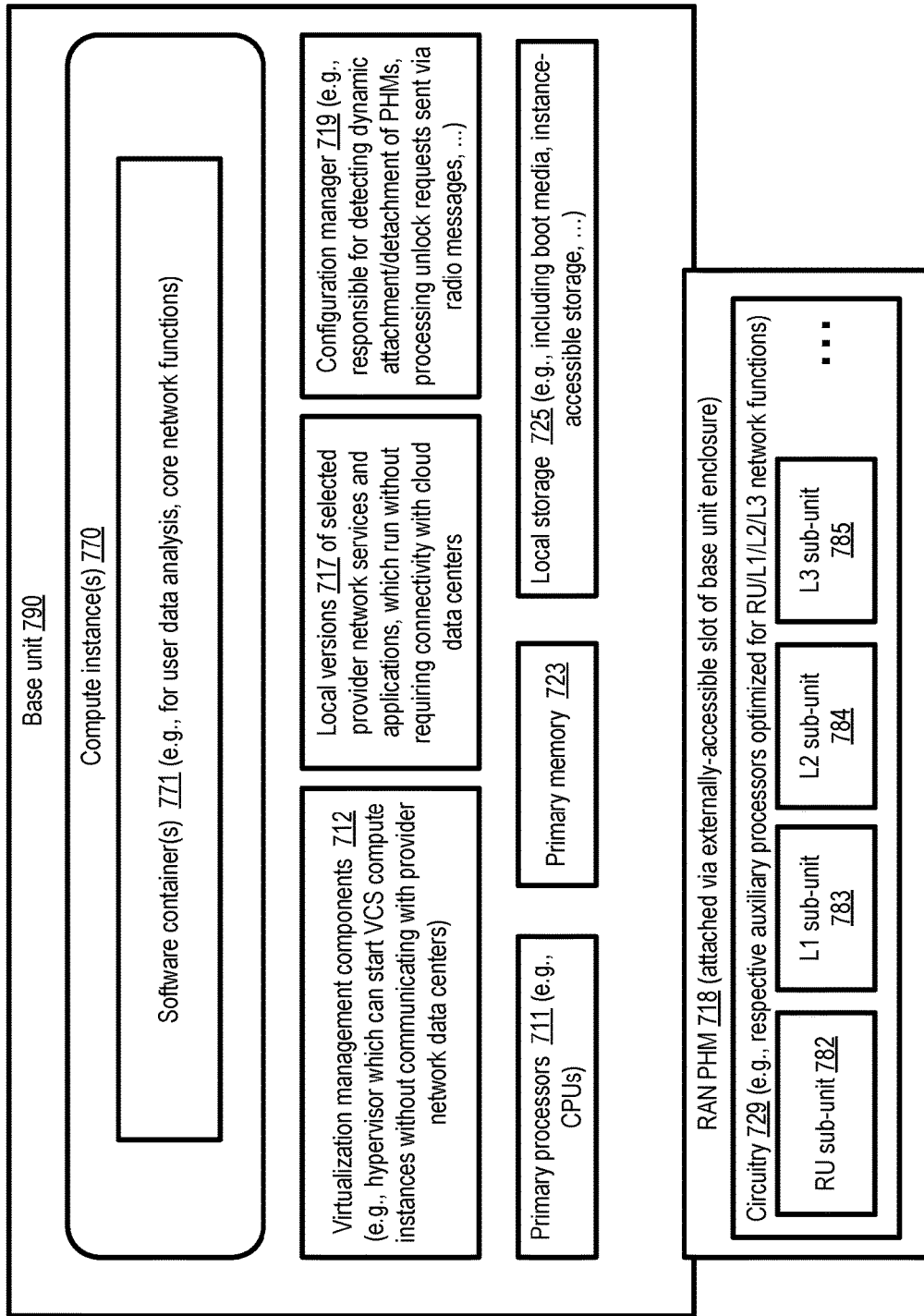
FIG. 7 illustrates example subcomponents of a field-reconfigurable server which may be used for implementing mobile private networks, according to at least some embodiments.

FIG. 7 illustrates example subcomponents of a field-reconfigurable server which may be used for implementing mobile private networks, according to at least some embodiments. In the scenario shown in FIG. 7, a field-reconfigurable server (FS) 710 may comprise a base unit 790 and at least one RAN PHM 718 (a pluggable hardware module at which network functions of a RAN node can be run). The base unit may include primary processor(s) 711, primary memory 723 and local storage 725. The RAN PHM 718 may be attached to the base unit via an externally-accessible slot of an enclosure or encasing of the base unit.

The FS 710 may include a number of software components run at the primary processor(s) 711 using executable program instructions stored in the primary memory in various embodiments. Such software may include virtualization management components 712, local versions 717 of selected provider network services and applications, and a configuration manager 719 in the depicted embodiment. The virtualization management components that are typically installed on VCS virtualization servers may require connectivity to control plane servers at provider network data centers, e.g., to receive commands to launch or terminate compute instances. In contrast, the FS's virtualization management components 712 may be designed such that they can start compute instances of a virtualized computing service (VCS) of the provider network locally, without communicating with provider network data centers at which VCS control plane servers run. Local versions 717 of the selected provider network services (such as a storage service, an IoT device management service, a database service, a machine learning service, etc.) may also be configured to run without requiring connectivity to the provider network data centers. The configuration manager 719 may, for example, be responsible for detecting attachment/detachment of PHMs, verifying that attached PHMs satisfy security criteria, causing a compute instance associated with a PHM to be launched by a virtualization management component if the PHM satisfies the security criteria, processing FS unlocking requests sent via radio messages, and so on. Collectively, the virtualization management components 712, local versions 717 and configuration manager 719 may enable cloud-disconnected mode (CDM) operation of the FS in the depicted embodiment, and may be referred to as a CDM-enabling software suite. The preparatory configuration tasks performed at the provider network for an FS before the base unit and PHMs of the FS are shipped/transported to provider network clients may include installation of the CDM-enabling software suite on the base unit in various embodiments.

One or more compute instances 770 (virtual machines) may be launched by the virtualization management components 712 in the depicted embodiment, e.g., at the request of the configuration manager, using machine images associated with respective PHMs including the RAN PHM. In at least some embodiments, the machine images may be stored in encrypted portions of boot media, part of local storage 725. In the embodiment depicted in FIG. 7, one or more software containers 771 may be launched within a given compute instance, e.g., to run applications that can analyze user data of MPN messages, to run mobile core network functions of an MPN, and so on. In at least one embodiment, after the configuration manager detects that a RAN PHM 718 has been attached and verifies that the RAN PHM satisfies security criteria, the configuration manager may cause a compute instance 770 which comprises software for running a subset of MPN network functions to be launched at the FS. The combination of network functions that are run on the PHM and the compute instance can then implement the entire MPN stack, without requiring communication with the cloud provider network. For a given message from a user equipment (UE) device received at the FS via an antenna (not shown in FIG. 7), one set of network functions may be executed at the PHM, and the results/output of those network functions may be provided as input to another set of network functions run at the compute instance, for example.

In some embodiments, the circuitry 729 of the RAN PHM 718 may be organized as a collection of sub-units for implementing respective groups of network functions. Each sub sub-unit may include any combination of various kinds of circuitry, such as general-purpose processors similar to CPUs, FPGAs (field-programmable gate arrays), custom chipsets, and/or radio-frequency (RF) integrated circuits. For example, an RU sub-unit 782 may comprise one or more auxiliary processors that implement radio unit (RU) network functions, L1 sub-unit 783 may comprise one or more one or more auxiliary processors that implement RAN L1 network functions (a subset of DU functionality), L2 sub-unit 784 may comprise one or more auxiliary processors that implement other DU/L2 network functions, and L3 sub-unit 785 may comprise one or more auxiliary processors that implement CU or L3 network functions. In some embodiments, multiple layers of a RAN node may be executed using a given auxiliary processor or circuitry. In one embodiment, the RAN PHM may include general purpose auxiliary processors which can be used to run mobile core network functions and/or other applications. In one embodiment, a processor of a PHM may be used to run a compute instance at which one or more network functions or edge applications may be executed.

The local versions 717 of provider network services may provide at least a subset of the functionality of the corresponding cloud-based provider network services. They may enable at least some analysis of user data of MPN messages to be performed locally at the FS, without having to transmit the data for analysis to the cloud provider network or any other destination. In some embodiments, depending on the MPN functionality and performance desired by the client, some phases of the analysis of user data may be performed at the FS using the local versions 717 and/or programs running within compute instances when the FS is run in cloud-connected mode (CCM), while other phases of the analysis may be performed using resources of the provider network services at data centers. In some embodiments, at least some of the same APIs that are supported by a provider network based service may also be supported by a corresponding local version 717. For example, consider a scenario in which an API API1 may be usable to submit a set of user data for inference using a trained model stored at a machine learning service of the provider network. In such a scenario, a local version of the machine learning service may support API1 as well, so that inference can be performed locally at the FS if desired. Because of the API compatibility maintained between the local versions and the corresponding provider network services in some embodiments, during CCM mode operation of the FS, the client on whose behalf the MPN is implemented may be able to switch seamlessly between local analysis of user data, and provider network-based analysis if desired. In some embodiments, a default set of commonly used local versions of provider network services may be installed at an FS prior to shipment of the FS to an MPN implementation location. In at least some embodiments, a client may indicate, via programmatic interfaces, the particular set of services for which local versions are desired on an FS. In various embodiments, a client may install their own data processing applications (e.g., applications that are designed and developed by the client, and need not necessarily support cloud provider network service APIs) on an FS after it is shipped to the client. In one embodiment, a client may submit a programmatic request to a provider network operator to install one or more custom applications on FS base units prior to shipment of the base units to the client.

In some embodiments, an FS 710 may include an embedded antenna for messages in the radio frequency ranges of an MPN. The antenna may be embedded on a pluggable hardware card at which RU network functions are run in some implementations. In one embodiment, an FS may include an embedded Wi-Fi antenna and/or other types of antennas, e.g., in addition to or instead of an antenna for radio-based communication. An FS may include one or more external antenna connectors in various embodiments, which can be used to attach radio frequency antennas, Wi-Fi antennas, and/or other kinds of antennas if desired. In some embodiments, an FS may include only embedded antennas, and connectors for external antennas may not be provided. In other embodiments, only connectors for external antennas may be provided, and embedded antennas may not be included in the FS.

Figure 8:
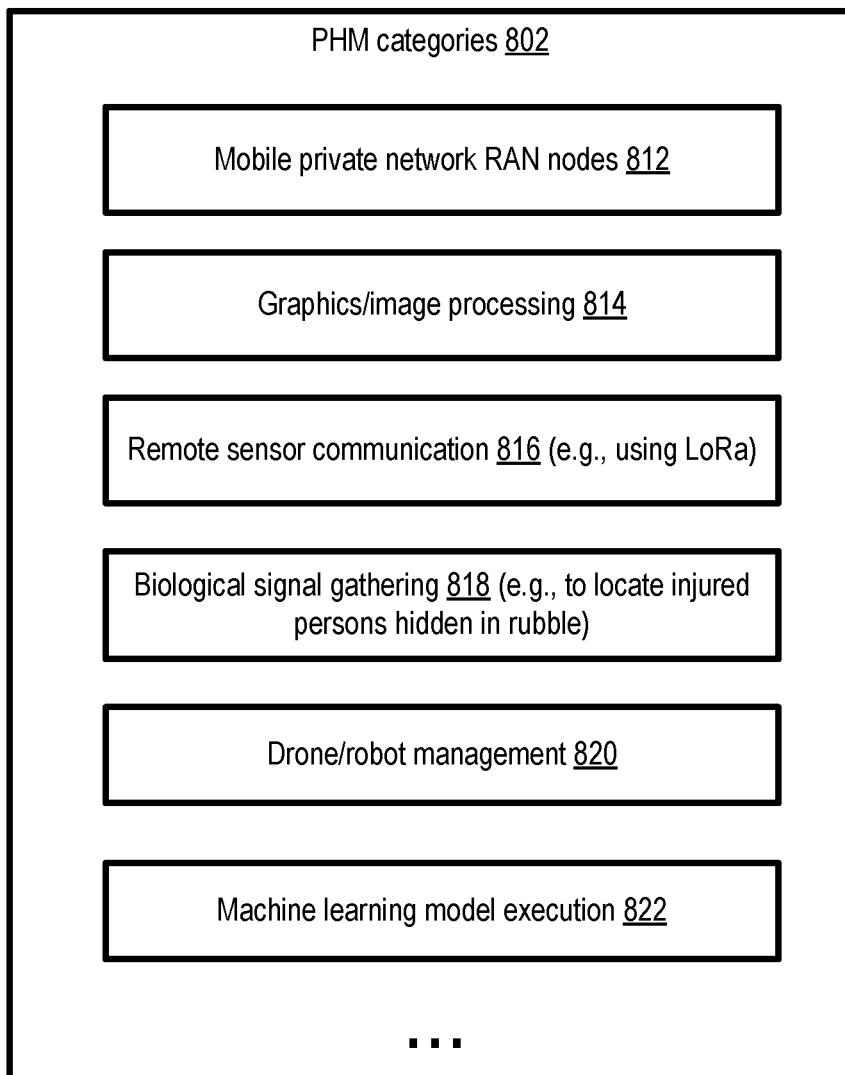
FIG. 8 illustrates example categories of pluggable hardware modules which may be dynamically attached to field-reconfigurable servers to implement various kinds of applications, according to at least some embodiments.

As mentioned earlier, a variety of PHMs may be attached to field-reconfigurable servers for use in deployment environment. FIG. 8 illustrates example categories of pluggable hardware modules which may be dynamically attached to field-reconfigurable servers to implement various kinds of applications, according to at least some embodiments. PHM categories 802 may include, among others, PHMs comprising circuitry for executing network functions of mobile private network RAN nodes 812, graphics or image processing 814, remote sensor communication 816 (e.g., using LoRa or similar long range radio signaling techniques), biological signal gathering 818 (e.g., to try to locate or identify injured persons within the rubble of a building after an earthquake via heat sensing or motion sensing), drone/robot management 820, machine learning model execution 822 and the like in various embodiments. PHMs may also be referred to as application-specific pluggable modules, as each type of PHM may typically be used to implement at least a portion of a particular type of application in various embodiments. At least some of the applications implementable using PHMs at an FS may not include computations implementing network functions of a radio-based communication network in various embodiments.

In some embodiments, a client of a provider network service such as an RCNMS may provide programmatic input indicating the types of applications that the client wishes to deploy with the help of field-reconfigurable servers, and the service may provide recommendations to the client for base units and PHMs that can be used for those kinds of applications. In one embodiment, for a given application (such as MPNs or video processing), the provider network service may have several PHMs available, which may differ from one another for example in their respective performance capacities, hardware vendors, the specific sets of network functions or other types of computations implemented, and the like.

Figure 9:
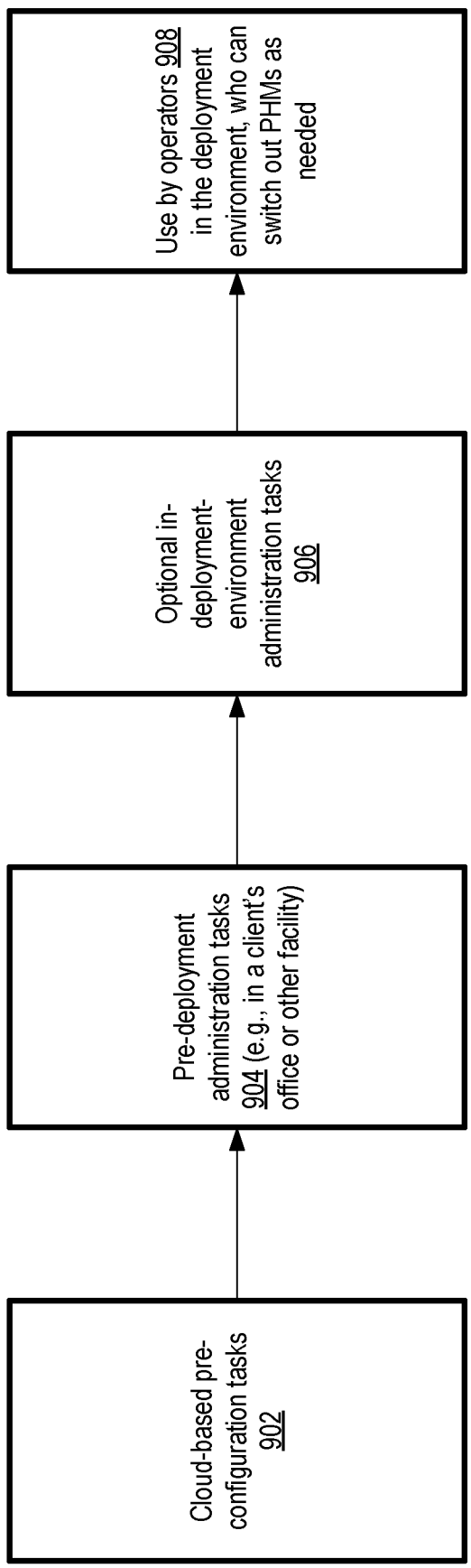
FIG. 9 illustrates example stages of the configuration and use of field-reconfigurable servers, according to at least some embodiments.

FIG. 9 illustrates example stages of the configuration and use of field-reconfigurable servers, according to at least some embodiments. In at least some embodiments, a set of preparatory configuration tasks on field-reconfigurable servers (FSs) may be conducted at a service of a cloud provider network, e.g., using a set of control plane servers of the service. Such cloud-based pre-configuration tasks 902 may for example include installing virtualization management components that can start up compute instances at a base unit of the kind introduced above without requiring connectivity with the provider network's data centers, installing configuration managers that can detect the attachment of PHMs, and so on. In at least some embodiments, metadata pertaining to a default set of acceptable or approved PHMs that clients can if desired attach to a field-reconfigurable server may be stored within local storage (e.g., a read-write portion of boot media) of a base unit of an FS as part of the pre-configuration tasks 902. In one embodiment, a client may use programmatic interfaces to indicate the specific kinds of PHMs that the client wishes to utilize in the field, and PHM metadata pertaining to only those types of PHMs may be stored in the base units as part of the cloud-based pre-configuration tasks 902. In some embodiments, at least some such preparatory configuration tasks may not be performed at the cloud provider network, but may instead be performed by an authorized third party technology partner of the cloud provider network, or by the customer who orders the FS. In some embodiments, an operator or user of an FS may plug in a PHM to an FS in the field, where pre-configuration tasks of the FS and/or the PHM have been performed offline.

One or more base units and a set of PHMs may be shipped to a client after the pre-configuration tasks are completed. In some embodiments, the client may designate one or more individuals as authorized administrators for the FSs, and such administrators may if desired perform addition pre-deployment administration tasks 904, e.g., in an office or other facility which is not the targeted deployment environment. Such pre-deployment tasks may for example include storing unlocking metadata at a set of radio-equipped devices that are to be used by FS end users (such as first responders) in the field, storing corresponding unlocking metadata at a base unit, adding/removing PHM metadata to a base unit for specific types of PHMs to further customize an FS, storing networking authentication information at a base unit and at small devices such as USB keys so that the USB keys can be used to set up local IP networks for the FSs in the field, and so on. The unlocking metadata to be propagated to radio-equipped devices, and/or the networking authentication information, may be provided to the administrator via programmatic interfaces from a control plane server of the cloud provider network in at least some embodiments. Note that in some embodiments, such pre-deployment administration tasks may not be performed for at least some FSs, e.g., because the pre-configuration tasks 902 are sufficient for the applications for which the FSs are going to be used.

The base unit(s) and a set of PHMs for one or more FSs may be transported, e.g., by the client, to the deployment environment where they are to be used. In some embodiments, optional in-deployment-environment administration tasks 906 may be performed there, e.g., by an individual tasked with managing the FS in the field. Such in-deployment-environment administration tasks may vary depending on the technological facilities available at the deployment environment—e.g., whether a laptop or tablet is available and can be physically attached to the base unit to perform administrative tasks, and so on. The optional in-deployment-environment administration tasks may be similar to those performed in pre-deployment administration tasks in some embodiments, enabling further customization of the FSs. In at least one embodiment, one or more PHMs may be attached to a base unit as part of the in-deployment-environment administration tasks, which may in turn cause one or more programs associated with the attached PHMs to be started up within the base unit. In an embodiment in which multiple FSs are to be used together in the fields, e.g., to set up an MPN in a distributed configuration similar to that shown in deployment environment 159 of FIG. 1, connectivity between multiple FSs may be established during in-deployment-environment administration tasks.

An FS may then be used in the field, e.g., by end users or operators such as first responders to communicate with one another using an MPN whose network functions are executed at the FS. During use by operators 908 in the deployment environment, in at least some embodiments PHMs may be dynamically detached or attached to the base unit of an FS, e.g., to enable different combinations of applications to be run in the field.

Figure 10:
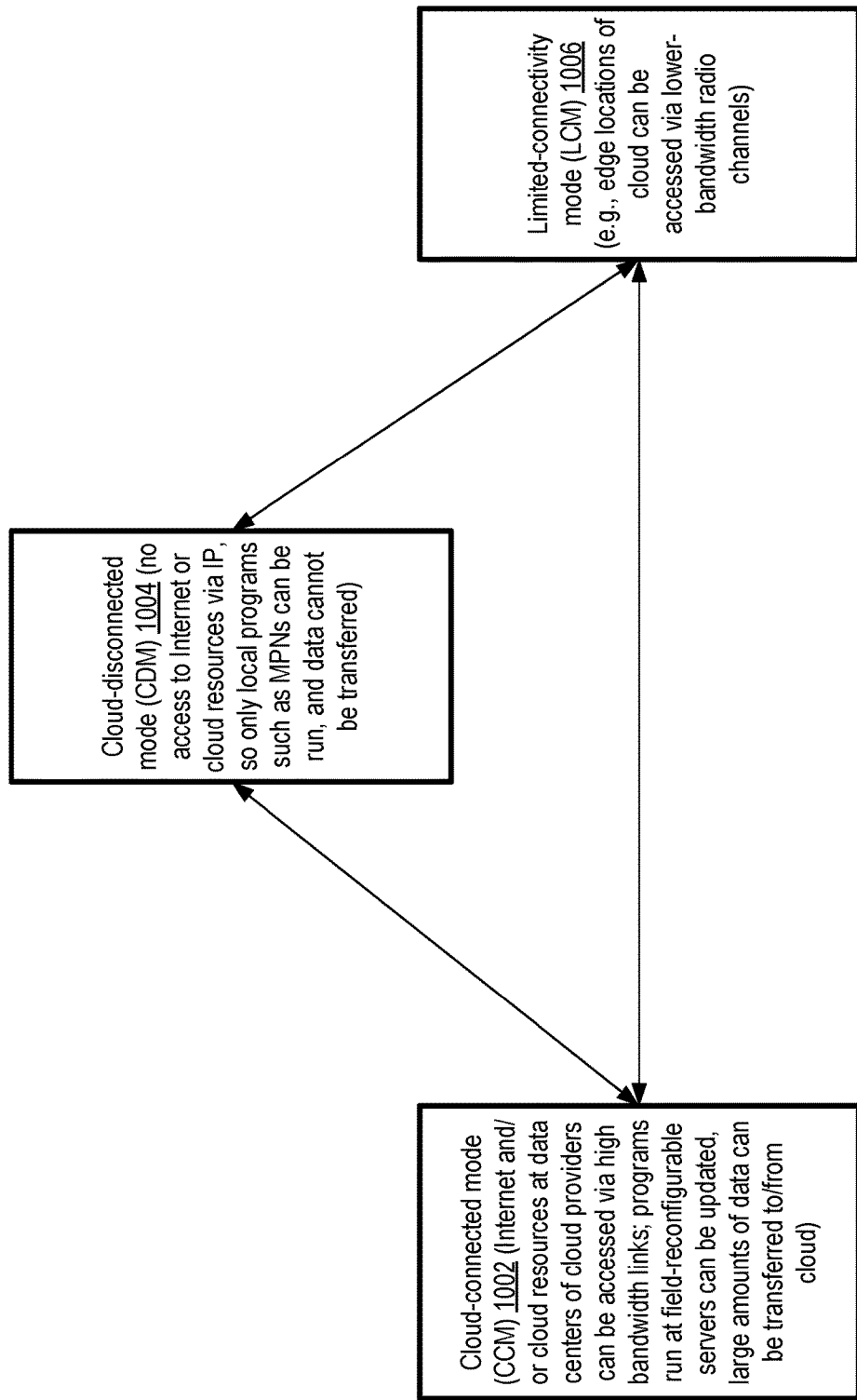
FIG. 10 illustrates example transitions of a field-reconfigurable server between states that differ from one another with respect to the level of connectivity available with a cloud provider network, according to at least some embodiments.

FIG. 10 illustrates example transitions of a field-reconfigurable server between states that differ from one another with respect to the level of connectivity available with a cloud provider network, according to at least some embodiments. In cloud-connected mode (CCM) 1002, the Internet may be accessible from an FS in some embodiments, and may be used to connect to cloud resources at various regional data centers of a cloud provider network. In other embodiments, private network links that provide direct connectivity to the provide network data centers may be used instead of the Internet in CCM. The network paths to the cloud data centers may support high bandwidths for data transfers in CCM. Programs being run at an FS (including for example local versions of provider network services) may be updated by downloading newer versions from the provider network, and/or large amounts of data may be transferred to/from the cloud.

In cloud-disconnected mode (CDM) 1004, IP connectivity to the provider network data centers and the Internet may be unavailable in various embodiments. Only programs that can run locally without requiring communication with cloud resources may be run, such as MPNs that are used for communication via 5G or 4G signals among a group of end users, collection and analysis of data from at IOT sensors, and so on.

In at least some embodiments, FSs may also operate in a third mode, referred to as limited-connectivity mode (LCM) 1006 for some periods of time. In this model, edge locations of the cloud provider network, such as local zones or outpost locations, may be accessed from an FS, e.g., via radio channels that provide relatively low bandwidth, but high bandwidth connectivity to the cloud data centers may not be available. In some embodiments, while operating in LVM, critical sets of data collected at an FS in the field may be transmitted to the edge locations, or critical programs may be sent from the edge locations to the FSs. In various embodiments, an FS may transition among the CCM, CDM and LCM modes of operation dynamically as many times as needed, without requiring any configuration changes.

Figure 11:
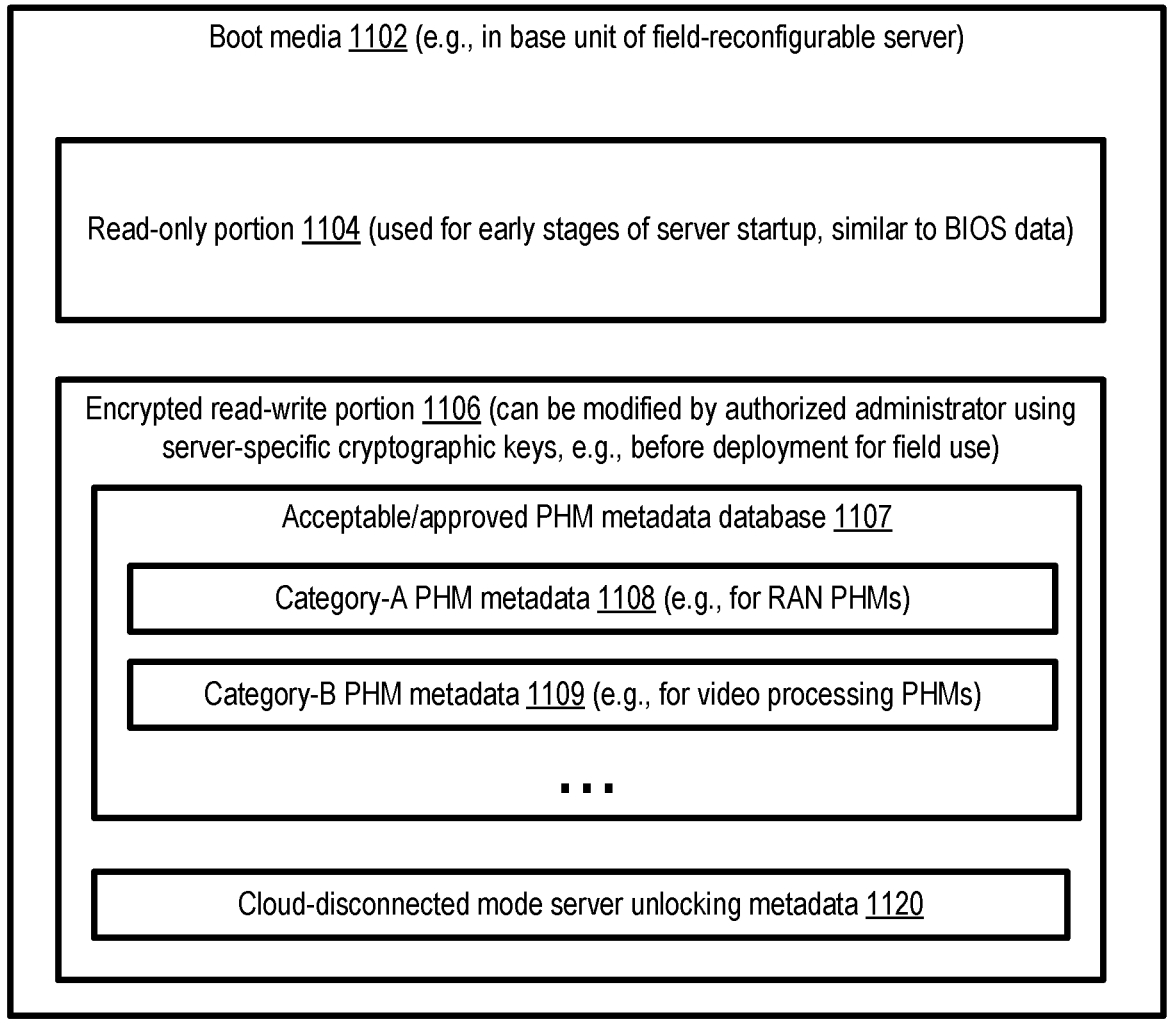
FIG. 11 illustrates examples of the kinds of information which may be stored within boot media of a field-reconfigurable server, according to at least some embodiments.

In some embodiments, as indicated above, metadata used for one or more kinds of security-related operations at an FS may be stored within a portion of boot media of the FS. FIG. 11 illustrates examples of the kinds of information which may be stored within boot media of a field-reconfigurable server, according to at least some embodiments. In the embodiment depicted in FIG. 11, a read-only portion 1104 of the boot media 1102 (e.g., a portion of a disk drive or nonvolatile flash memory) incorporated within the base unit of an FS may be used for early stages of a server startup procedure of the FS. The read-only portion 1104 may contain similar kinds of configuration data that is stored in the BIOS (basic input/output system) of personal computers, and may for example be used to perform essential integrity tests on the base unit hardware in some embodiments. Note that in at least one embodiment, an FS may be used to run a set of applications without attaching any PHMs. In one such embodiment, the read-only portion of the boot media may be used to bring up the FS if no PHM is attached, while both the read-only portion and the read-write portion may be used to bring up the FS if a PHM is attached prior to powering on the base unit.

In the embodiment shown in FIG. 11, the boot media 1102 may include an encrypted read-write portion 1106. Data that is written to the read-write portion 1106 may for example be encrypted using a FS-specific set of one or more cryptographic keys (unique to each FS) provided by a control plane server of an RCNMS or similar provider network service to the client who orders the FS from the provider network. An administrator of the FS (e.g., an authorized individual selected by the client that ordered the FS, or by an organization to which the client belongs) may be provided the key(s), and may use the keys to add or modify contents of the encrypted read-write portion in various embodiments. In some embodiments, at least some metadata (e.g., metadata pertaining to a default set of approved PHMs that can be attached to the FS in the field) may be stored at the encrypted read-write portion of the boot media prior to shipment of the base unit from the provider network. In other embodiments, the read-write portion may not contain any data pertaining to approved PHMs at the time that the base unit is received by a client, and authorized administrators may write metadata into the read-write portion after the base unit is received.

In various embodiments, the encrypted read-write portion 1106 may include a database 1107 of metadata pertaining to acceptable/approved PHMs. Such a database, which may for example be implemented as a directory or folder in some implementations, may include metadata 1108 pertaining to a particular class of PHMs referred to in FIG. 11 as Category-A PHMs (e.g., PHMs that implement RAN network functions and can be used for MPNs or other RCNs, metadata 1109 pertaining to a different class Category-B PHMs (e.g., PHMs that perform video processing computations), and so on. Examples of the types of metadata which may be stored for a given class of PHMs in various embodiments are provided in FIG. 12. The categories of PHMs for which respective sets of metadata are stored in the read-write portion of the boot media may be approved by the client that orders the FS (i.e., the base unit and a set of PHMs that belong to the categories) in the depicted embodiment. In some embodiments, control plane servers of a provider network service may store metadata for a default set of PHM categories as part of the pre-configuration tasks performed before the base unit is shipped to a client, and an administrator may then remove metadata pertaining to such default PHM categories that are not required by the client.

In at least some embodiments, the encrypted read-write portion of the boot media may include unlocking metadata 1120 that can be used to unlock the FS in the field during time periods in which connectivity to the cloud provider network is unavailable. Such metadata, which may for example include cryptographically-generated identifiers assigned to individual ones of a set of radio-equipped devices that are provided to authorized operators/end users in the field, may be referred to as cloud-disconnected mode server unlocking metadata. Further details regarding the unlocking techniques which may be used for FSs in the field are provided below. In some embodiments, the boot media 1102 may include other elements not shown in FIG. 11.

FIG. 12 illustrates examples of the kinds of metadata, pertaining to pluggable hardware modules, which may be stored at a field-reconfigurable server, according to at least some embodiments. For each class or category of PHMs that is approved for use at a given FS by a provider network client that orders the FS, approved PHM metadata 1202 stored at the base unit's local storage (e.g., within boot media) may include a user-friendly module name 1204, a module category identifier 1206, and a module category public key 1208 in the depicted embodiment. The module name 1204 may make it easier for clients to refer to the module category when communicating with provider network services in various embodiments, while the module category identifier may comprise a unique string selected by the provider network to refer to the module category in internal databases of the provider network. Each module category may be assigned a pair of cryptographic keys in some embodiments, with a private key of the pair being stored within each PHM of the category, and the public key being stored in the approved PHM metadata 1202. The private key may be used by the PHM to encrypt artifacts such as digital certificates provided to the base unit, e.g., in response to a certificate request during PHM setup in some embodiments as discussed below. The public key may be used by the configuration manager in such embodiments to decrypt such artifacts.

In at least one embodiment, the approved PHM metadata may include mounting information 1209. Such mounting information may, for example, indicate parameters of a "mount" command that can be issued to enable application data, generated/collected at a PHM, to be accessed at a compute instance (e.g., a compute instance launched at the base unit using virtual machine image 1210) running at the FS in the depicted embodiment. In effect, the mounting information may enable a PHM to be accessed as though the PHM's data contents were part of a directory, folder or drive of the FS.

In at least some embodiments, a respective compute instance, similar in functionality and at least some supported APIs to compute instances of a VCS of the provider network, may be launched using the primary processors of an FS to allow a PHM which has been attached to the base unit of the FS to be used/accessed for applications such as MPNs. Virtual machine image 1210, included within the approved-PHM metadata for a given PHM, may be used to launch such a compute instance in at least some embodiments. The machine image may, for example, be prepared by a developer or vendor of the PHM in some embodiments in accordance with provider network-supplied specifications for machine images that can be used to launch VCS compute instances. In one embodiment, if for example a given FS has four PHMs of distinct approved categories attached to its base unit, four compute instances may be launched at the base unit, with each compute instance used for communicating with a respective PHM. In some embodiments, a single compute instance may be used to communicate with multiple PHMs, e.g., using a machine image stored in the approved PHM metadata for one of the multiple PHMs.

In some embodiments, the approved PHM metadata may include an auto-start flag 1212. If the auto-start flag is set to TRUE by an administrator of the FS, and a PHM is re-attached to a base unit after having been attached and detached earlier while the FS remains powered on, the configuration manager of the FS may cause a compute instance which had been started up earlier at the FS for the PHM (and then paused after saving the PHM's state information when the PHM was detached) to automatically resume operations as though the PHM had not been detached. If the auto-start flag is set to FALSE in such an embodiment, the compute instance may be restarted instead, thereby losing saved state information of the PHM. Other types of metadata pertaining to approved PHMs may be stored at a base unit of an FS in some embodiments than the types shown in FIG. 12.

Figure 13:
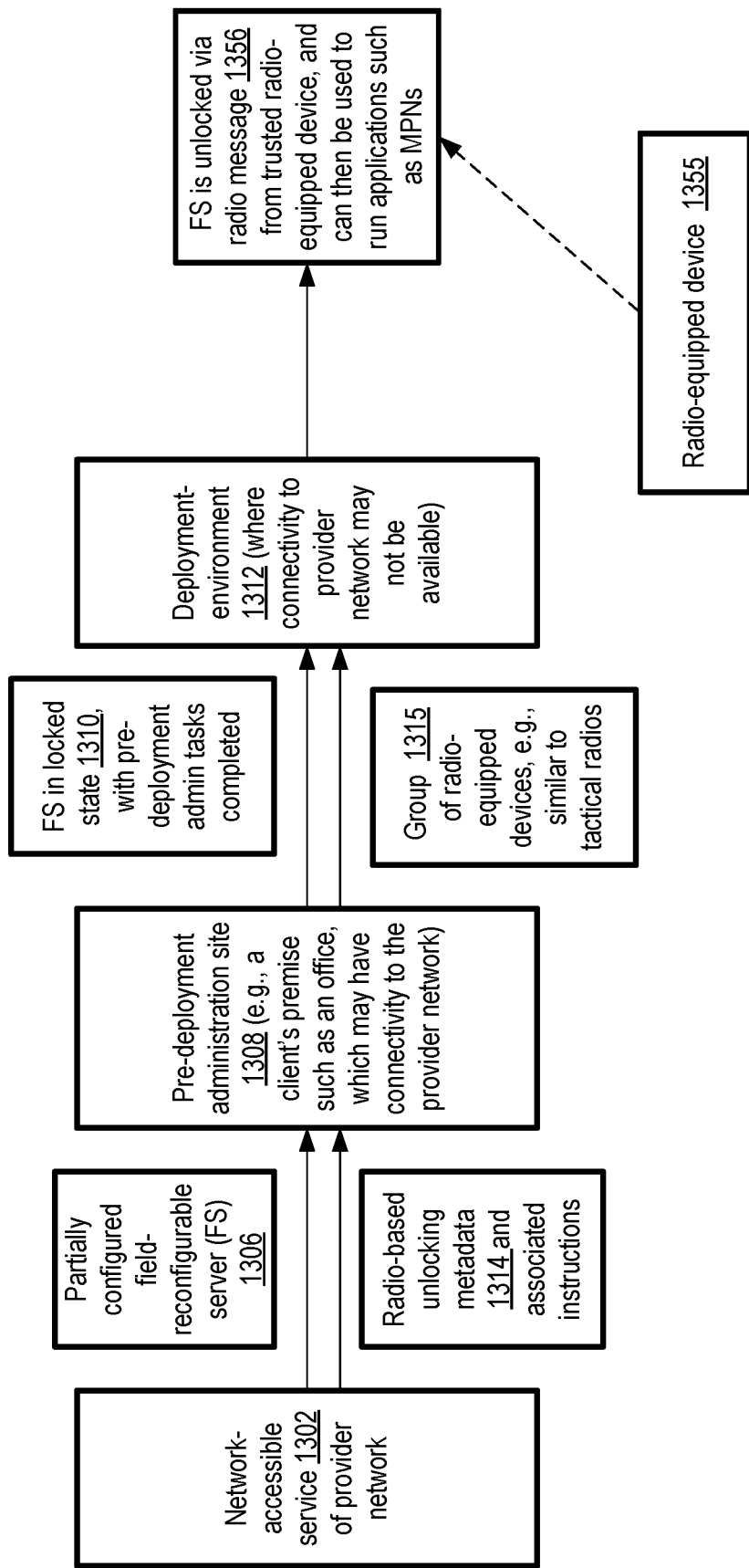
FIG. 13 illustrates example aspects of a methodology for unlocking field-reconfigurable servers in scenarios in which connectivity to cloud provider networks is unavailable, according to at least some embodiments.

FIG. 13 illustrates example aspects of a methodology for unlocking field-reconfigurable servers in scenarios in which connectivity to cloud provider networks is unavailable, according to at least some embodiments. In the embodiment shown in FIG. 13, a partially-configured field-reconfigurable server (FS) 1306, similar in features and functionality to PHFSs 155 of FIG. 1, may be shipped from a network-accessible service 1302 of a provider network to a pre-deployment administration site 1308. In some cases the base unit of the FS may be shipped with one or more PHMs physically attached via the slots on the enclosure of the base unit; in other embodiments, the base unit and PHMs may be shipped separately. Preliminary configuration operations such as the kinds of cloud-based pre-configuration tasks discussed in the context of FIG. 9 may be performed, e.g., on the base unit and/or on one or more PHMs, at a data center of the provider network in the depicted embodiment, prior to the shipment of the FS to the pre-deployment administration site 1308. The pre-deployment administration site may for example comprise an office or a data center of the client who orders the FS. There, additional configuration operations of the kind described as pre-deployment administration tasks 904 in FIG. 9 may be performed in various embodiments on the FS. In at least some cases, connectivity to the data centers of the provider network may be available at a pre-deployment administration site.

After the pre-deployment administration tasks are completed, the FS may be transported in a powered-off and locked state 1310 to a deployment environment 1312 in the depicted embodiment. The state of the FS may be described as "locked" in that at least some applications for which the FS is intended to be utilized in the field (such as an MPN or IoT sensor data collection) may be prevented or prohibited from running at the FS after the FS is powered on in the field, until a set of FS-specific security-related steps (collectively referred to as "unlocking" the FS) have been completed. To enable operators or end users of the FS to perform the FS-specific security-related steps while the FS does not have connectivity to the cloud provider network, a group 1315 of trusted radio-equipped devices 1355 may also be sent to the deployment environment in the depicted embodiment. Such radio-equipped devices may each be capable of sending radio signals in a specified frequency range (e.g., a range that differs from the frequency ranges used for 5G or 4G MPNs) over relatively short distances to a radio signal receiver of the FS. In some embodiments, such a receiver and/or an associated antenna may be built in to the base unit of the FS. In other embodiments, such a receiver and/or an associate antenna may be attached to a physical port on the enclosure of the base unit. In one embodiment, one of the slots that can be used to attach a PHM to the base unit may be used to attach an unlocking-specific PHM temporarily, and such an unlocking-specific PHM may be used to receive the radio signals from the trusted radio-equipped devices.

In at least one embodiment, metadata 1314 (referred to as radio-based unlocking metadata 1314) that can be used to generate artifacts for the security-related steps needed to unlock the FS in the field while the FS lacks connectivity with the provider network may be provided from a control plane server of the network-accessible service via programmatic interfaces to an administrator of the FS. At least a portion of such unlocking metadata may be installed on, or otherwise propagated/copied to, each of the trusted radio-equipped devices of group 1315 in various embodiments, e.g., by the administrator of the FS using instructions provided programmatically by a control plane server of the network-accessible service. The group of such devices may then be provided to end-users of the FS at the deployment environment. In the deployment environment, the FS may be unlocked via a radio message 1356 from one or more of the trusted radio-equipped devices 1355. To unlock the FS, in some embodiments at least a portion of contents of the radio message may be checked, e.g., by a configuration manager of the FS, to verify that it has been generated using radio-based unlocking metadata 1314 and/or to verify that one or more other criteria associated with the radio-based unlocking metadata 1314 are met. In one embodiment the radio-based unlocking metadata 1314 may have an associated validity expiration time, and the criteria that have to be checked to unlock the FS may include ensuring that the validity expiration time has not been reached, e.g., in addition to ensuring that the contents of the radio message (such as a unique cryptographic string or identifier associated with the FS) were generated using the unlocking metadata 1314. If such criteria are satisfied, in some embodiments a configuration parameter enabling the startup of various applications and/or associate compute instances may be set appropriately. Such a setting, indicating that the FS has been unlocked may remain in effect until the FS is re-locked or powered off in some embodiments. After the FS is unlocked, it may be used to run one or more applications such as an MPN, e.g., with a portion of an application being run at a PHM if desired.

In at least some embodiments, there may be at least two techniques available to unlock an FS after it has been transported away from the provider network. A first technique, in which radio messages from trusted devices of the kind discussed above are used, may be usable at least in scenarios in which connectivity is unavailable to the provider network data centers. A second technique may be used during time periods in which connectivity to the provider network is available at a location of the FS. In the second technique, non-radio-based unlocking metadata that can be used to unlock the FS without requiring radio messages may be transmitted via a network from the provider network service control plane, e.g., to a laptop or tablet device of an FS user using a programmatic interface such as a web-based console, a command-line tool or a set of APIs. Once such non-radio-based unlocking metadata is obtained by an FS user, it may then be transmitted to the FS and the FS may thereby be unlocked. In one embodiment, the radio message-based unlocking technique may be employed at an FS, if desired, even if connectivity to the provider network is available.

Figure 14:
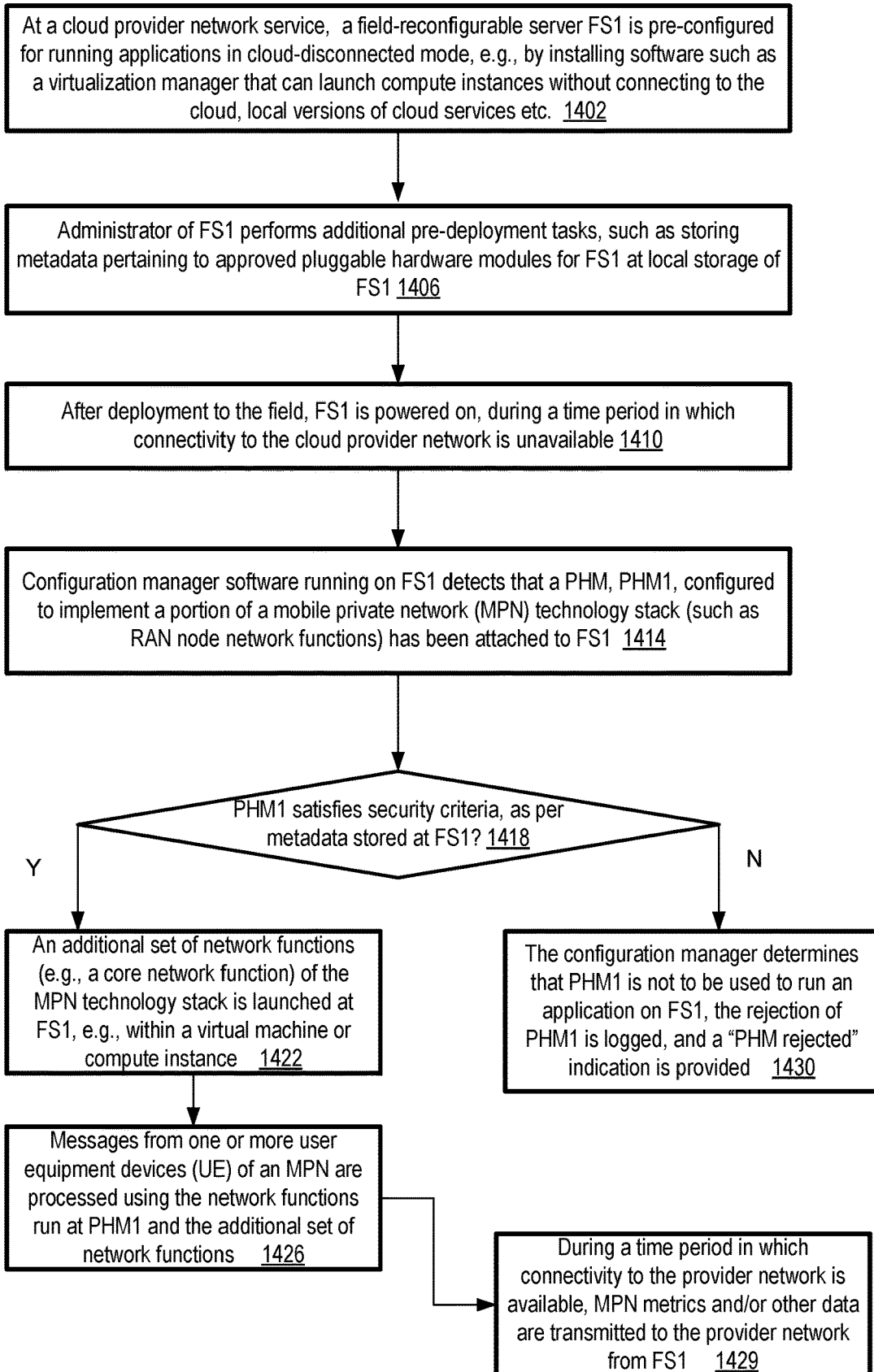
FIG. 14 is a flow diagram illustrating aspects of operations which may be performed to configure and utilize a mobile private network implemented using a field-reconfigurable server, according to at least some embodiments.

FIG. 14 is a flow diagram illustrating aspects of operations which may be performed to configure and utilize a mobile private network implemented using a field-reconfigurable server, according to at least some embodiments. As shown in element 1402, a field-reconfigurable server FS1 may be pre-configured, at a cloud provider network service such as an RCNMS, for running applications such as MPNs in cloud-disconnected mode. FS1 may comprise a base unit with one or more primary processors, a memory and an attached radio-antenna. The preparatory configuration steps performed at the cloud provider network may include, for example, installing software such as a virtualization manager that can launch compute instances at FS1 without requiring connectivity with the cloud provider network, installing local versions of various cloud provider network, and the like in different embodiments.

FS1 may then be shipped to a client of the provider network. An administrator of FS1 (e.g., an employee of an organization that ordered FS1) may perform additional pre-deployment tasks on FS1 in various embodiments (element 1406), e.g., at a location such as an office that differs from the target deployment environment of FS1. Such tasks may include storing metadata pertaining to a set of approved PHMs for FS1 at local storage (such as an encrypted portion of boot media) in one embodiment.

After deployment to the field, FS1 may be powered on (element 1410). During a time period in which connectivity to the provider network is unavailable from the location of FS1, configuration manager software running on the primary processors of FS1 (e.g., within a base unit of SF1) may detect that a PHM, PHM1, configured to implement a portion of an MPN technology stack has been attached to FS1 (element 1414). PHM1 may have been attached to an enclosure of the base unit of FS1 via an externally-accessible slot, such that disassembly of the enclosure or the base unit is not required to attach PHM1 in various embodiments. In at least some embodiments, the portion of the MPN technology stack that is implemented at PHM1 may include a set of network functions of a RAN node, which can be executed at an auxiliary processor or other circuitry incorporated within PHM1.

The configuration manager may authenticate PHM1, and/ or perform additional operations to determine whether PHM1 meets a set of security criteria in the depicted embodiment. If it is determined that PHM1 has been successfully authenticated and/or satisfies the set of security criteria, as determined in operations corresponding to element 1418, an additional set of network functions of the MPN may be launched at FS1 (element 1422). In at least some embodiments, the additional set of network functions may include network functions of the mobile core network of the radio-based communication network. In one embodiment, the additional set of network functions may be launched within a virtual machine or compute instance which is launched using the primary processors of the base unit. A machine image used to launch the virtual machine may be included in the metadata pertaining to approved PHMs in some embodiments. The additional set of network functions may be launched at FS1 without requiring connectivity to the cloud provider network un various embodiments, e.g., during a time period in which connectivity between FS1 and the provider network data centers is unavailable.

Collectively, the network functions implemented at PHM1 and FS1's base unit may comprise all the network functions needed for an MPN or other similar radio-based communication network in various embodiments. Messages received from a user equipment (UE) device of an MPN/ RCN may be processed using the network functions run at PHM1, and output of those network functions may in turn be processed using the additional set of network functions run at the base unit in various embodiment (element 1426). Various metrics pertaining to the MPN may be collected at FS1, such as the rates at which network functions at different layers of the MPN technology stack are executed, the number of UE devices communicating with FS1 over various periods of time, the utilizations of the processors and memories of the bae unit and the PHMs attached to the base unit, and so on.

If and when connectivity to the provider network becomes available, FS1 may connect to one or more resources of the cloud provider network service. During such a time period, the currently available MPN metrics at FS1 and/or other data (such as application data) may be transmitted to the provider network from FS1 (element 1429).

MPN functionality may continue to be provided if/when FS1 is transported from one location to another in various embodiments—e.g., some messages of a communication session of the UE device may be processed at FS1 while FS1 is stationary at a location L1, additional messages of the session may be processed while FS1 is being moved from L1 to another location L2, and so on. In some embodiments, additional PHMs may be attached to the base unit of FS1 to perform computations that are not part of a radio-based communication network, such as IoT sensor data collection and processing, image/video processing computations and the like. In some embodiments, a different PHM for implementing MPN RAN functions, with a different performance capacity rating in terms of the maximum rate at which a RAN network function can be executed at the PHM, may be attached to the base unit from time to time as needed in the field, without requiring communication with the provider network.

If, in operations corresponding to element 1418, a determination is made that PHM1 does not satisfy security criteria (e.g., if PHM cannot be authenticated using the approved-PHM metadata stored at FS1), the configuration manager may determine that PHM1 cannot be used to run an application on FS1 (element 1430) in the depicted embodiment. The rejection of PHM1 may be logged, e.g., using local storage of FS1 in various embodiments. In one embodiment, a "PHM rejected" indication may be provided on FS1 (e.g., via an LED (light-emitting diode) display or the like).

Figure 15:
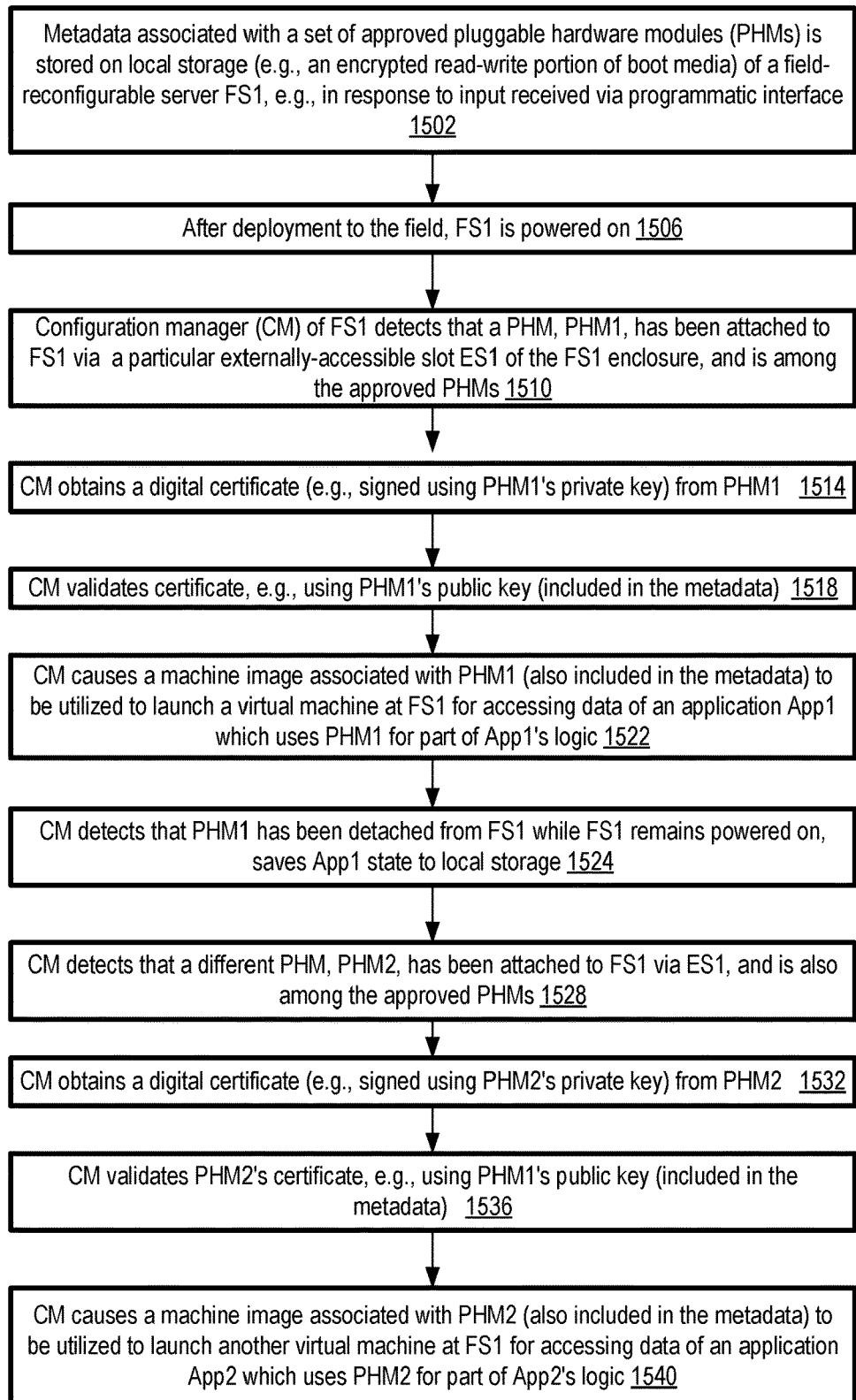
FIG. 15 is a flow diagram illustrating aspects of operations which may be performed to securely run a variety of applications using respective pluggable hardware modules at a field-reconfigurable server, according to at least some embodiments.

FIG. 15 is a flow diagram illustrating aspects of operations which may be performed to securely run a variety of applications using respective pluggable hardware modules at a field-reconfigurable server, according to at least some embodiments. As shown in element 1502, metadata associated with a set of approved PHMs may be stored at local storage of a field-reconfigurable server FS1, e.g., in response to input received via a programmatic interface. In some embodiments, the metadata may be stored within an encrypted read-write portion of boot media of FS1. In at least one embodiment, at least a portion of the metadata may be stored in response to input provided by an administrator of FS1, e.g., after FS1 has been shipped to a client from a cloud provider network. In some embodiments, at least a portion of the metadata may be stored in response to input provided at a cloud provider network, before FS1 is shipped to a client.

After FS1 is deployed to the field (e.g., to some location external to the cloud provider network data centers, where connectivity to the cloud provider network may at least temporarily be unavailable), FS1 may be powered on (element 1506). A configuration manager (CM) of FS1, or some other program running in privileged mode at FS1, may detect that a PHM PHM1 has been attached to FS1 via a particular externally-accessible slot ES1 of an enclosure of FS1 (element 1510). The CM may determine that PHM1 is an approved PHM, e.g., using a list of approved PHMs that is part of the metadata in some embodiments.

The CM may obtain a digital certificate (e.g., signed using a private cryptographic key associated with PHM1) from PHM1 in various embodiments (element 1514). In some embodiments, the certificate may be validated by the CM, e.g., using a public key associated with PHM1 (element 1518). The public key may be included in the metadata in at least some embodiments. The digital certificate and the keys used to encrypt/decrypt them may comprise examples of respective security artifacts.

In the embodiment depicted in FIG. 15, the CM may cause a machine image associated with PHM1 (which is also stored as part of the metadata) to be utilized to launch a virtual machine or compute instance at FS1 for accessing data of an application App1 which uses PHM1 circuitry (e.g., auxiliary processors within PHM1) for implementing part of App1's logic (element 1522). In at least one embodiment, the metadata may include module mounting configuration information that can be used to mount memory or storage of PHM as a directory, folder or drive, and the module mounting information may be used to enable the application data to be accessed from PHM1 by a program running within the virtual machine. If at any stage the CM is unable to confirm that PHM1 should be allowed to run App1 at FS1, e.g., if PHM1 is not identified as an approved module, or if its certificate cannot be validated, App1 execution may be prohibited in various embodiments.

The CM may at some point detect that PHM1 has been dynamically detached from FS1, e.g., while FS1 remains running (element 1524). In at least some embodiments, state information of App1 may be stored, e.g., in local storage of FS1, in response to detecting the detachment. In some embodiments, the saved state information may be used to resume the execution of FS1, starting from the state in which PHM1 was detached, if PHM1 is later re-attached to FS1.

The CM may detect that a different PHM, PHM2, has been attached to FS1 via the same slot which was being used by PHM1 (element 1528). The CM may verify that PHM2 is also among the approved PHMs, and obtain a digital certificate from PHM2 (element 1532). This digital certificate may have been signed using PHM2's private key in at least some embodiments. The CM may validate PHM2's certificate, using a public key associated with PHM2 and also stored as part of the metadata in various embodiment (element 1536). The CM may then cause a machine image associated with PHM2 (and also included in the metadata) to be utilized to launch another virtual machine at FS1 (element 1540). Programs within this virtual machine may be enabled to access data of a second application App2 from PHM2, e.g., using module mounting information stored in the metadata for PHM2. At least a portion of App2 may be run using circuitry within PHM2.

Operations similar to those shown in FIG. 15 may be performed regardless of whether a PHM (such as PHM1 or PHM2) is attached to FS1 prior to powering FS1 on. Or before FS1 is powered on in various embodiments. If a PHM is attached before FS1 is powered on, the attachment of the PHM may be detected by the CM after FS1 is powered on and the CM starts running at the base unit's primary processors in some embodiments. If a PHM is re-attached to FS1 at a point in time at which the corresponding virtual machine (which was started up when the PHM was initially attached) remains running, the existing virtual machine may be used to communicate with PHM1; otherwise, the machine image associated with the PHM may be used to launch a new virtual machine in some embodiments.

Figure 16:
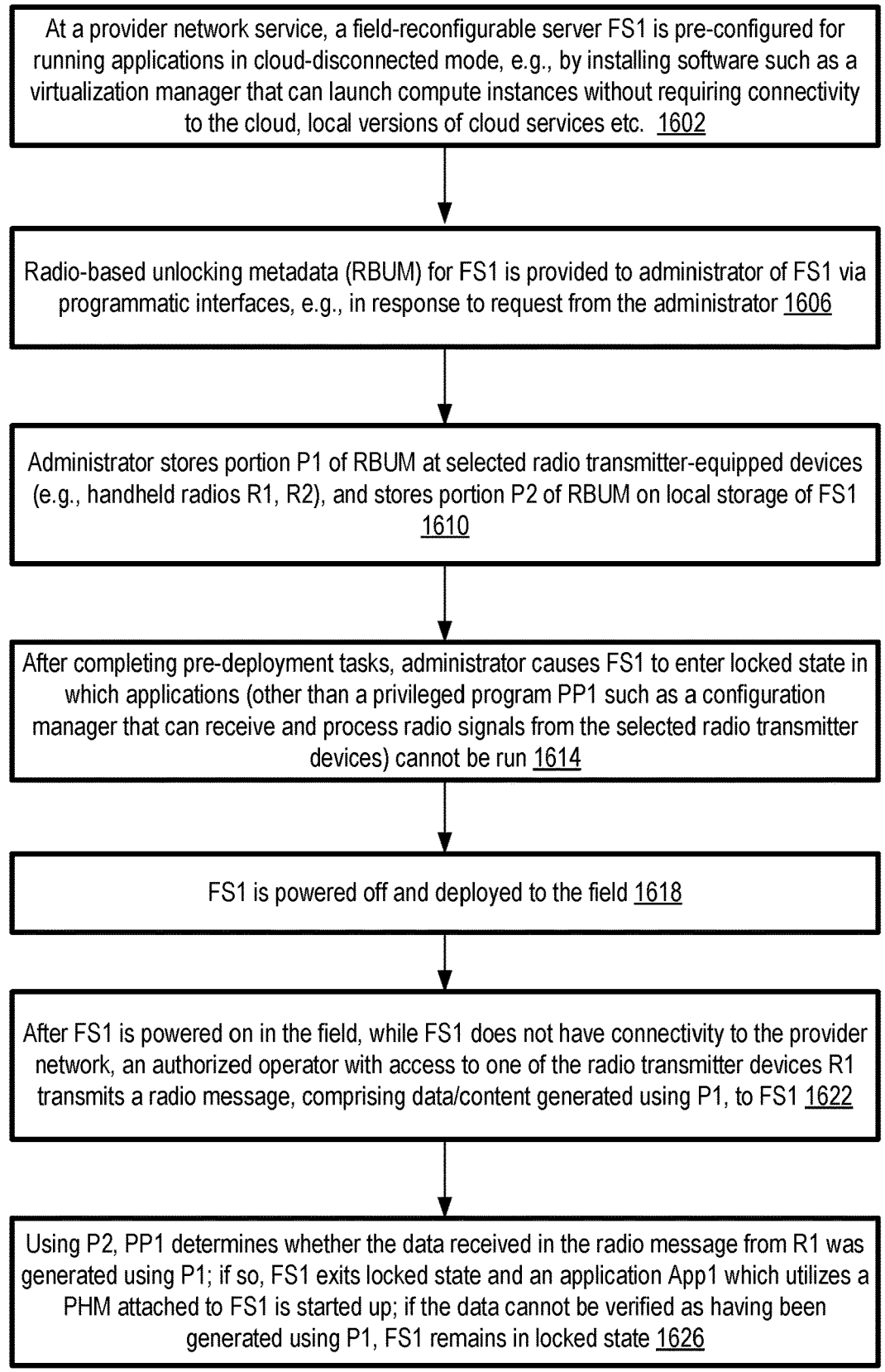
FIG. 16 is a flow diagram illustrating aspects of operations which may be performed to securely unlock a field-reconfigurable server which has been deployed into an environment in which connectivity to a cloud provider network is unavailable, according to at least some embodiments.

FIG. 16 is a flow diagram illustrating aspects of operations which may be performed to securely unlock a field-reconfigurable server which has been deployed into an environment in which connectivity to a cloud provider network is unavailable, according to at least some embodiments. As shown in element 1602, a field-reconfigurable server FS1, similar in features and functionality to PHFSs 155 of FIG. 1, may be pre-configured (e.g., at a cloud-based network accessible service such as an RCNMS) for running applications in various modes including cloud-disconnected mode (CDM). Such preparatory configuration steps may include, for example, installing software such as a virtualization manager that can launch compute instances without requiring connectivity to a cloud provider network, installing local versions of provider network services, and the like.

A set of radio-based unlocking metadata RBUM specific to FS1, and intended to be propagated to radio transmitter-equipped devices accessible to authorized users of FS1, may be provided to an administrator of FS1 via programmatic interfaces in the depicted embodiment, e.g., by a control plane server of the network-accessible service in response to a programmatic request from the administrator (element 1606). The administrator may store a first portion P1 of the RBUM at one or more selected radio transmitter-equipped devices such as handheld radios R1 and R2 to be provided to authorized users/operators of FS1, and a second portion P2 of the RBUM may be stored at local storage of a base unit of FS1 in some embodiments (element 1610). P2 may for example include a rule or logic for analyzing content of received radio messages to determine whether P1 was used to generate the content in one embodiment. In some embodiments, P2 may be stored in an encrypted format, e.g., in a read-write portion of boot media. In some embodiments, the selected radio transmitter-equipped devices may be configured to transmit radio signals in a frequency range other than the frequency ranges used for 5G or 4G applications. In one embodiment, radio-equipped devices similar to tactical radios may be used. In some embodiments, P2 and/or indications of rules to evaluate criteria associated with RBUM may be stored in an encrypted format, e.g., with a portion of boot media of FS1.

After completing pre-deployment administration tasks such as those described above in the context of FIG. 9 and FIG. 13, the administrator may cause FS1 to enter a locked state in which one or more applications, such as an MPN that utilizes a PHM, cannot be run (element 1614). Note that a privileged program PP1 such as a configuration manager, that can receive and process radio signals sent from the radio transmitter devices, may be run at FS1 even in the locked state in the depicted embodiment.

FS1 may be powered off and transported for field deployment while remaining in the locked state in various embodiments (element 1618). After FS1 is powered on in the field, and during a time interval in which FS1 does not have connectivity to the provider network, an authorized operator or end user with access to one of the radio transmitter-equipped devices R1 may use R1 to send a radio message to FS1 (element 1622). The radio message may comprise data or content (e.g., a cryptographically-secure string, key, or other similar artifact, which was assigned to FS1 by the administrator prior to field deployment of FS1) generated using the portion P1 of the RBUM that was earlier placed/stored/installed on R1 in various embodiments.

In at least one embodiment, the privileged program PP1 may use P2 (the other portion of the RBUM, which was stored on FS1 itself) to determine whether the contents of the radio message sent from R1 were generated using P1 (element 1626). If PP1 is available to verify that the contents of the radio message were generated using P1, in some embodiments FS1 may be unlocked, e.g., by storing a flag indicating that various applications, compute instances and the like can be launched. In at least one embodiment, in addition to or instead of the criterion that the contents of the radio message were generated using P1, other criteria associated with RBUM may be used to decide whether FS1 should be unlocked, such as verifying that an expiration timeout associated with RBUM has not expired. If all the applicable criteria are satisfied and FS1 is unlocked, an application App1 (such as an MPN) that utilizes a PHM attached to a base unit of FS1 may be launched at FS1. If the unlocking criteria are not satisfied, e.g., if the content or data contained in the radio message was not generated using P1, FS1 may remain in a locked state in the depicted embodiment. Once FS1 has been unlocked, it may be used to run various PHM-based applications of the kinds discussed earlier in the context of FIG. 8, e.g., in parallel with one another and/or while FS1 itself is being moved or transported from one location to another. PHMs for different applications may be attached/detached dynamically as desired in at least some embodiments. Note that in at least some embodiments, the radio message-based unlocking technique described herein may be used to unlock servers that do not utilize PHMs.

Figure 17:
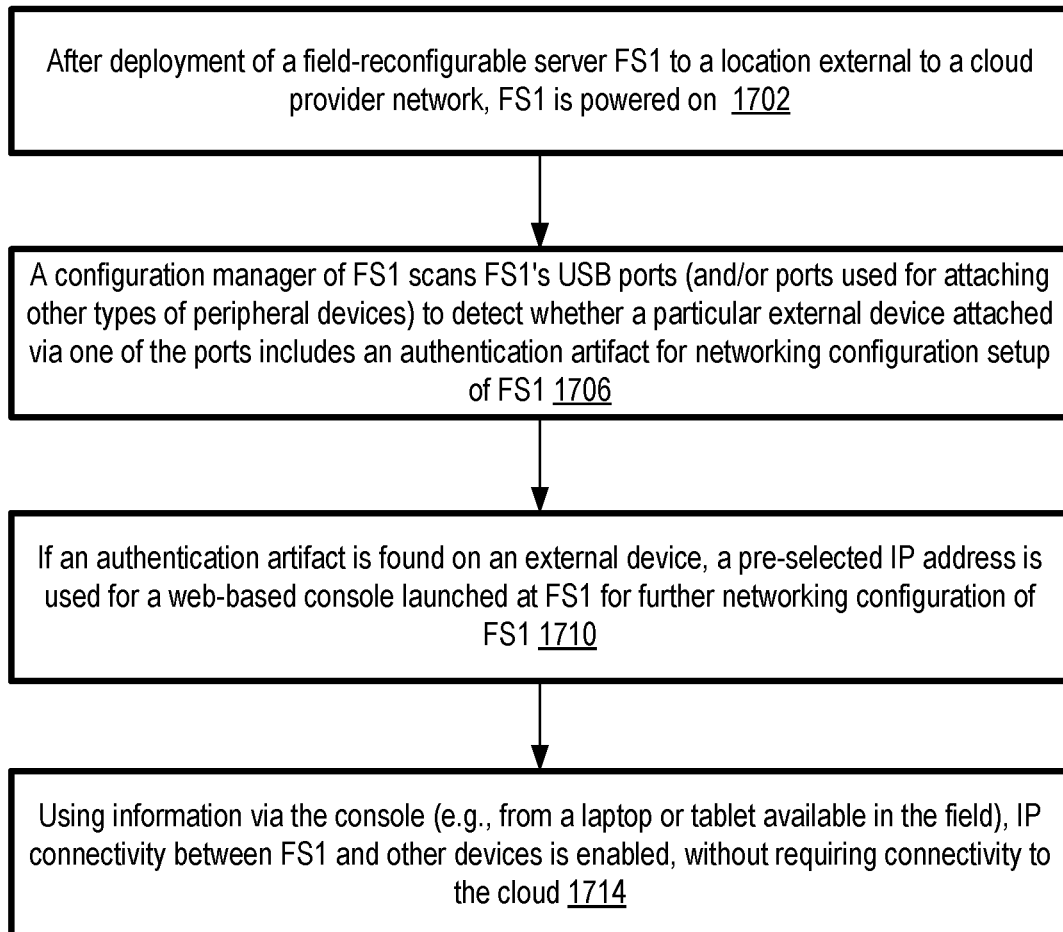
FIG. 17 is a flow diagram illustrating aspects of operations which may be performed to set up a local network at a field-reconfigurable server which has been deployed into an environment in which connectivity to a cloud provider network is unavailable, according to at least some embodiments.

FIG. 17 is a flow diagram illustrating aspects of operations which may be performed to set up a local network at a field-reconfigurable server which has been deployed into an environment in which connectivity to a cloud provider network is unavailable, according to at least some embodiments. After deployment of a field-reconfigurable server FS1, similar in features and functionality to PHFSs 155 of FIG. 1, to a location external to the data centers of a cloud provider network, FS1 may be powered on (element 1702).

During a boot or bring-up phase of FS1 after power-on, a configuration manager or other similar privileged program of FS1 may scan FS1's USB ports (and/or ports for attaching other types of peripheral devices using standards other than USB) in the depicted embodiment (element 1706). The scan may be performed, for example, to determine whether an external device attached via one of the ports includes an authentication artifact for networking configuration setup of FS1.

If such an authentication artifact is found on an external device attached via a port, a pre-selected IP address may be used for a web-based console launched at FS1 for receiving input for further networking configuration of FS1 in some embodiments (element 1710). Using information received via the console (e.g., from a laptop of tablet available in the field), IP connectivity between FS1 and one or more other devices may be enabled in various embodiments, without requiring connectivity to the cloud provider network (element 1714). It is noted that in various embodiments, some of the operations shown in the flow diagrams of FIG. 14, FIG. 15, FIG. 16 and/or FIG. 17 may be implemented in a different order than that shown in the figures, or may be performed in parallel rather than sequentially. Additionally, some of the operations shown in FIG. 14, FIG. 15, FIG. 16 and/or FIG. 17 may not be required in one or more implementations.

Figure 18:
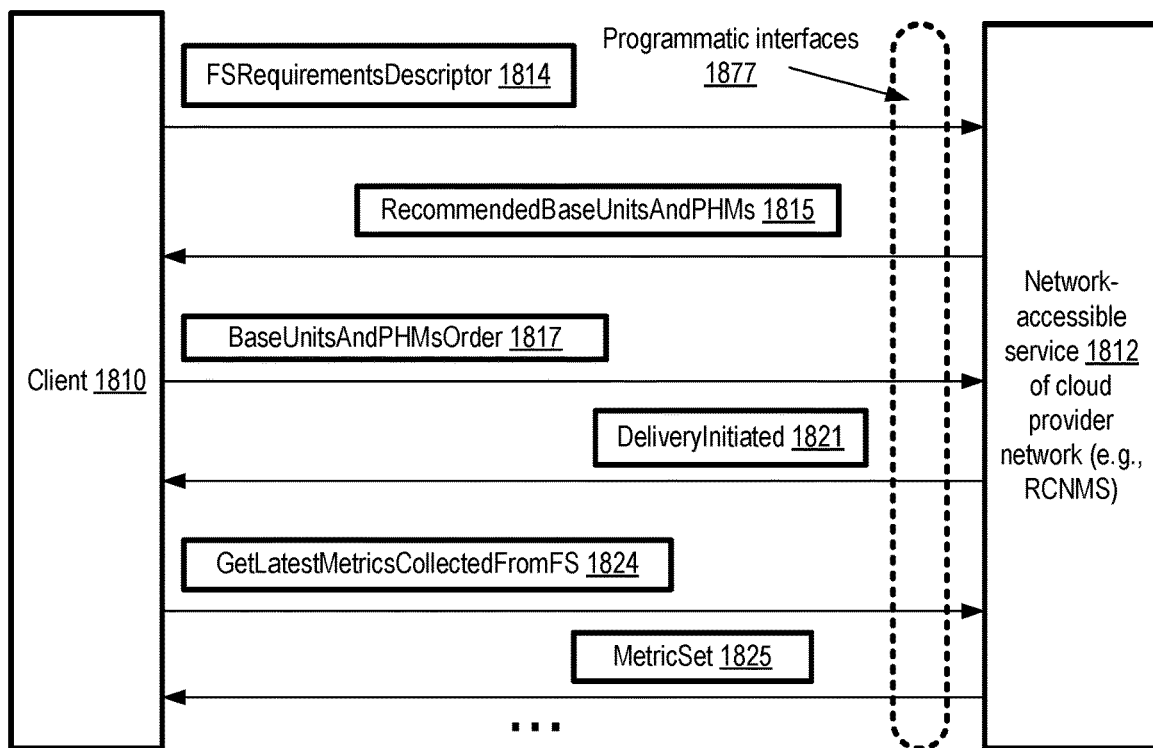
FIG. 18 illustrates example programmatic interactions pertaining to the configuration and use of a field-reconfigurable server, according to at least some embodiments.
Figure 18:
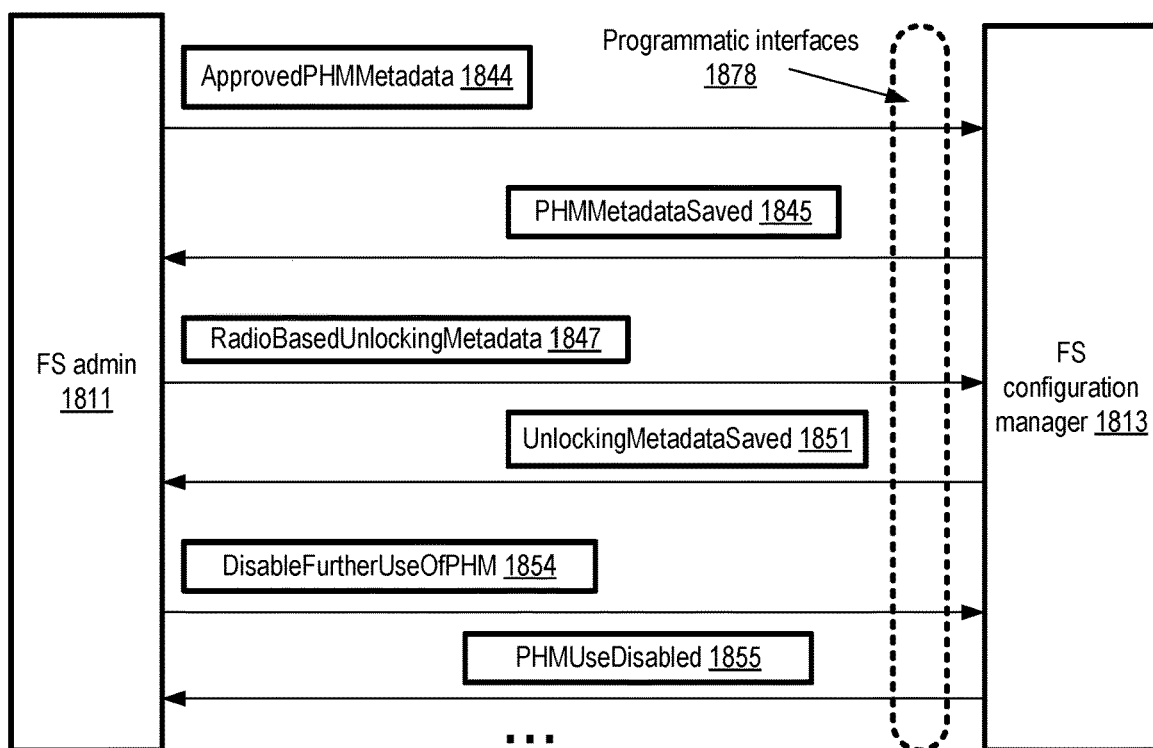

FIG. 18 illustrates example programmatic interactions pertaining to the configuration and use of a field-reconfigurable server, according to at least some embodiments. A few examples of two kinds of interactions are shown in FIG. 18: interactions between a client and a network-accessible service (such as an RCNMS similar to RCNMS 110 of FIG. 1), and interactions between an administrator of a field-reconfigurable server and a configuration manager or other similar privileged program running at the field-reconfigurable server.

A network-accessible service 1812 of a cloud provider network may implement a first set of programmatic interfaces 1877, such as a web-based console, command-line tools, application programming interfaces (APIs), graphical user interfaces and the like which can be employed by a client 1810 to submit requests and preferences regarding FSs of the kind introduced earlier, and obtain corresponding responses in the depicted embodiment. In the embodiment depicted in FIG. 18, the service 1812 may enable its clients to order FSs of a variety of categories, which may differ from one another for example in the performance capacities of their respective base units, sizes/weights of the base units in isolation or when attached to PHMs, the default set of software (including the particular provider network services whose local versions is installed) of the base units, the types of PHMs which can be attached to the base units, the kinds of techniques which the FSs support for unlocking the FSs in the field, the kinds of techniques which the FSs support for setting up local networks, and so on. Different PHMs may be attachable to the base units to implement portions of respective applications such as MPNs or other RCNs, analysis of data collected from sensors, machine learning models, etc. as discussed earlier. In some embodiments, even for a given application, multiple PHMs may be available which can be attached to a particular base unit, with such PHMs differing from one another in properties such as performance capacities, vendors of the PHMs, the type of circuitry (e.g., systems-on-chip (SOCs), field-programmable gate arrays (FPGAs), etc.) used at the PHMs, algorithms used for particular network functions, the specific subset of network functions of a radio-based communication network that can be executed at a PHM, and so on.

In some embodiments, the service 1812 may be able to provide recommendations for the particular combinations of base units and PHMs that may be best suited for the client's requirements. The client 1810 may submit an FSRequirementsDescriptor message 1814 to the service via programmatic interfaces 1877. The FSRequirementsDescriptor message may describe various aspects of the applications/networks that the client wishes to implement using FSs provided by the service, such as the problem domains to be addressed using the FS (e.g., whether the client wishes to implement an MPN, some other kind of RCN or applications which are not related to radio-based communication), constraints on the sizes/weights of the FSs, performance requirements for the applications, examples of the deployment environments targeted for the FSs, security requirements (such as the kinds of unlocking techniques the client prefers for FSs during time periods when connectivity to the provider network is unavailable from the FS, and/or the kind of local networking setup techniques the client wishes to use), and so on. Based on an analysis of the requirements in view of the kinds of base units and PHMs available, the service 1812 may send a RecommendedBaseUnitsAndPHMs message 1815 to the client, containing one or more combinations of base units and PHMs that may be able to meet the client's requirements in the depicted embodiment.

The client may review the recommendations (or view a catalog of available FS base units and compatible PHMs) and submit a BaseUnitsAndPHMsOrder request 1817 to the service in the depicted embodiment. The BaseUnitsAndPHMsOrder request may indicate the set of base units and PHMs that the client wishes to obtain from the service. The base units and PHMs may be shipped to a location indicated in the BaseUnitsAndPHMsOrder request from the provider network, e.g., after completing a set of preliminary configuration tasks of the kind described earlier. A DeliveryInitiated message 1821 may be sent to the client in some embodiments to indicate that the base units and PHMs are in transit to the specified location.

In at least some embodiments, as discussed earlier, an FS may operate in cloud-disconnected mode (CDM) for at least some time periods after it is deployed in the field. During such time periods (and also during time periods in which connectivity is available to the provider network data centers), various types of metrics may be collected at the FS, such as the number of executions of various kinds of network functions during a given time interval, the number of UE devices connecting to an MPN implemented at the FS during various time intervals, and so on. During time periods in which connectivity to the provider network is available at the FS, the latest sets of such metrics may be sent to the provider network service control plane servers in some embodiments, and/or to a monitoring service implemented at the provider network. The client on whose behalf an FS is deployed may view the metrics of the FS that have been saved at the cloud provider network, e.g., by sending one or more GetLatestMetricsCollectedFromFS 1824 requests to the service 1812. The most recent set of metrics available at the service may be provided via one or more MetricSet messages 1825 in the depicted embodiment.

In various embodiments, an FS configuration manager 1813, running for example on the processors of the base unit of an FS, may implement a set of programmatic interfaces 1878 (such as a console accessible via an IP address assigned to the FS during local networking setup) which can be used by an FS administrator 1811 to perform some kinds of configuration tasks on the FS. Using such a programmatic interface 1878, an FS administrator may submit a set of metadata pertaining to approved PHMs via one or more ApprovedPHMMetadata messages 1844. The metadata may be saved in local storage at the base unit of the FS, and a PHMMetadataSaved message 1845 may be sent to the FS admin in some embodiments. In at least some embodiments, the metadata may be encrypted, e.g., by the FS administrator or the FS configuration manager using unique cryptographic artifacts specific to the FS, before it is saved. In one embodiment, the metadata may be stored in the boot media of the FS.

According to some embodiments, the FS administrator may provide unlocking metadata to the FS configuration manager, which can be used in the field to unlock the FS using radio messages sent from a trusted radio device as described above. A RadioBasedUnlockingMetadata message 1847 comprising at least a portion of the metadata may be sent to the FS configuration manager via the programmatic interfaces 1878 in some embodiments. The unlocking metadata may be stored at local storage of the FS, e.g., as part of boot media of the FS, and an UnlockingMetadataSaved message 1851 may be sent to the client in at least some embodiments.

In one embodiment, an FS administrator may wish to disable further use of a PHM which was being used earlier at an FS. A DisableFurtherUseOfPHM message 1854 may be sent to the FS configuration manager in one embodiment to accomplish such an objective. The FS configuration manager may modify the metadata pertaining to approved PHMs to disable further use of the specified PHM in some embodiments, and send a PHMUseDisabled message 1855 to the FS administrator. It is noted that in different embodiments, programmatic interactions other than those shown in FIG. 18 may be supported by a provider network service and/or by an FS configuration manager. For example, the FS configuration manager may provide metrics collected at the FS to the FS admin in response to a programmatic request not shown in FIG. 18. In some embodiments, one or more of the kinds of interactions shown in FIG. 18 may not be supported.

Figure 19:
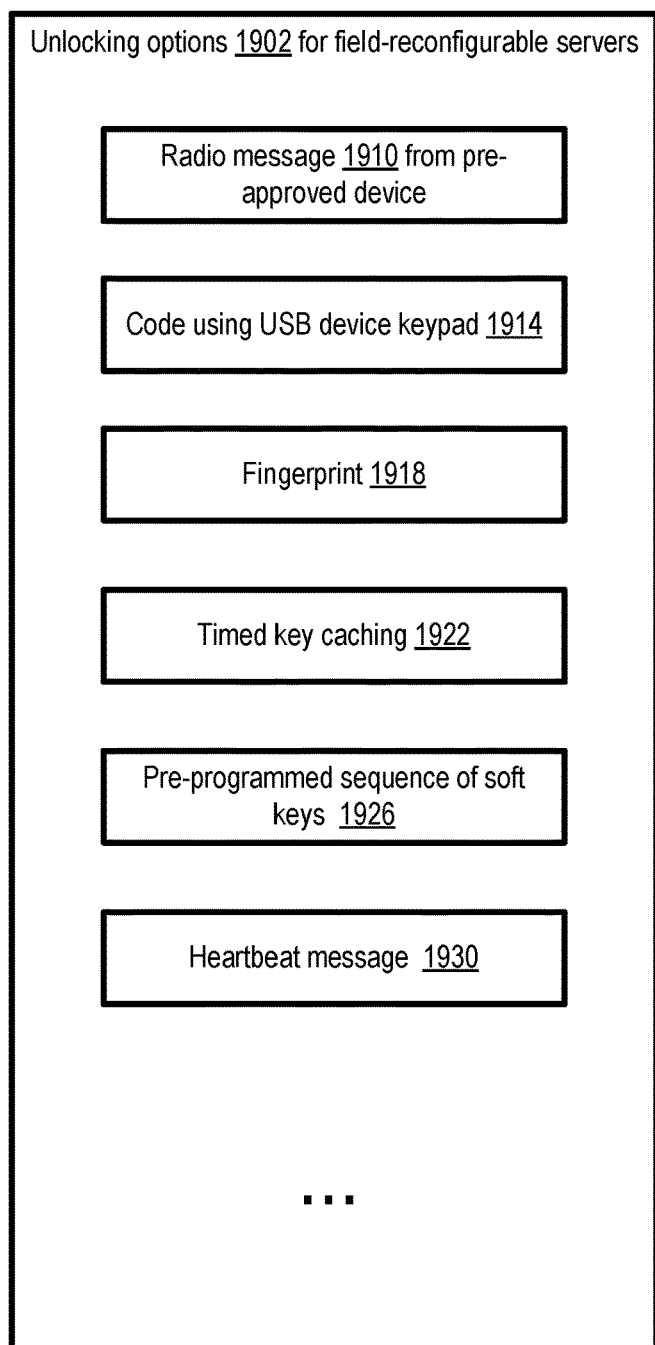
FIG. 19 illustrates example alternative techniques that may be utilized to unlock a field-reconfigurable server, according to at least some embodiments.

As indicated in FIG. 13, in at least some embodiments a field-reconfigurable server may be sent to a deployment environment in a locked state, such that even after it is powered on in the field, the startup of applications for which the server is intended to be used in the field (where connectivity to the cloud provider network may be unavailable) may not be permitted until one or more additional security steps are completed to unlock the server. FIG. 19 illustrates example alternative techniques that may be utilized to unlock a field-reconfigurable server, according to at least some embodiments. In various embodiments, some of the unlocking options 1902 for field-reconfigurable servers indicated in FIG. 19 may be employed only when connectivity to the provider network is unavailable, and/or in scenarios in which a local network has not been set up to communicate with the server. If connectivity to the provider network happens to be available, the field-reconfigurable server may be unlocked using credentials and/or other security artifacts downloaded from the provider network (e.g., to a laptop or tablet device, from which the security artifacts can be transmitted or copied to the server via a local network) in one embodiment. In other embodiments, at least some of the techniques indicated in FIG. 19 may be employed regardless of whether connectivity to the provider network is or is not available from a location at which the field-reconfigurable server is to be utilized or unlocked.

As indicated earlier in the context of FIG. 13 and in FIG. 16, in some embodiments FS unlocking options may include a technique in which a radio message 1910 from a pre-approved radio-equipped device is received at the server, and contents of the message are analyzed to verify that the contents were created using unlocking metadata associated with the server. If the verification succeeds, the server may exit the locked state, and the applications for which the server is deployed (which may be executed partly at one or more PHMs) may be started up In at least one embodiment, a code using a USB device keypad 1914 may be used to unlock the server. In this approach, a secure USB device that stores unlocking metadata encrypted at rest may be provided to a user authorized to unlock the FS in the field, e.g., by an FS administrator. In the field, the device may be inserted into a USB port of the server, and a code (also provided in advance to the authorized user) may be entered. If the code is validated, a configuration manager or similar software running at the FS may mount the device as a folder or drive, extract the unlocking metadata from the USB device and cause the server to exit the unlocked state. Devices that use interfaces other than USB may be used in some implementations for entering the code.

In some embodiments, a fingerprint 1918 of an authorized user may be used to unlock the server in the field. In one such embodiment, the FS may comprise a built-in fingerprint reader; in other embodiments, an external device (e.g., a USB device) with a fingerprint reader may be employed. Multiple fingerprint-enabled devices, each comprising unlocking metadata, may be distributed by an FS administrator to authorized users in advance of FS deployment in such embodiments, such that any of the devices can be used to unlock the server.

Timed key caching 1922 may be used to unlock an FS in some embodiments. In this approach, the administrator of the FS can specify a time period during which the FS can be automatically unlocked on power-up using unlocking metadata stored in advance at the FS. The administrator can enable this option prior to deployment of the FS to the field, and store an encrypted file indicating the time period. When the FS is powered on, the configuration manager can extract the time period information, and if the time period has not expired, cause the FS to exit the locked state. In some embodiments, the base unit of the FS may comprise a TPM (Trusted Platform Module) with an associate cryptographic key pair, and the file comprising the time period may be encrypted using a private key of the pair.

In one embodiment, the base unit of an FS may comprise a set of soft keys that are pre-programmed by the FS administrator such that a particular sequence of keystrokes entered via the soft keys by an authorized user can be used to unlock the FS. Such a technique involving using a pre-programmed sequence of soft keys 1926 may require the FS administrator to inform authorized users in advance about the correct sequence of soft keys to use.

According to some embodiments, the FS may be unlocked automatically if a heartbeat message 1930 specific to the FS (e.g., containing a string or identifier unique to the FS), or a sequence of such heartbeat messages, is received at the configuration manager, from a trusted laptop or tablet that is configured within the same local network as the FS. In some cases, if connectivity to the cloud provider network is available, the heartbeat messages to unlock the FS may be received from a provider network service. The FS administrator may be able to program the transmission of the heartbeat messages in some embodiments to enable the FS to be unlocked.

In some implementations, whichever technique is used to unlock the FS, the FS may once again enter the locked state if and when it is powered down. In such implementations, the unlock procedure may have to be re-employed each time the server is powered back up again. In other implementations, once the FS is unlocked, it may remain unlocked across power cycles for specified time intervals. In some embodiments, multiple unlocking options such as those shown in FIG. 19 may be supported by a given FS. In one embodiment, a client or customer may specify, to the provider network service from which an FS is being ordered, the specific types of unlocking techniques the customer wishes to use in the field.

Figure 20:
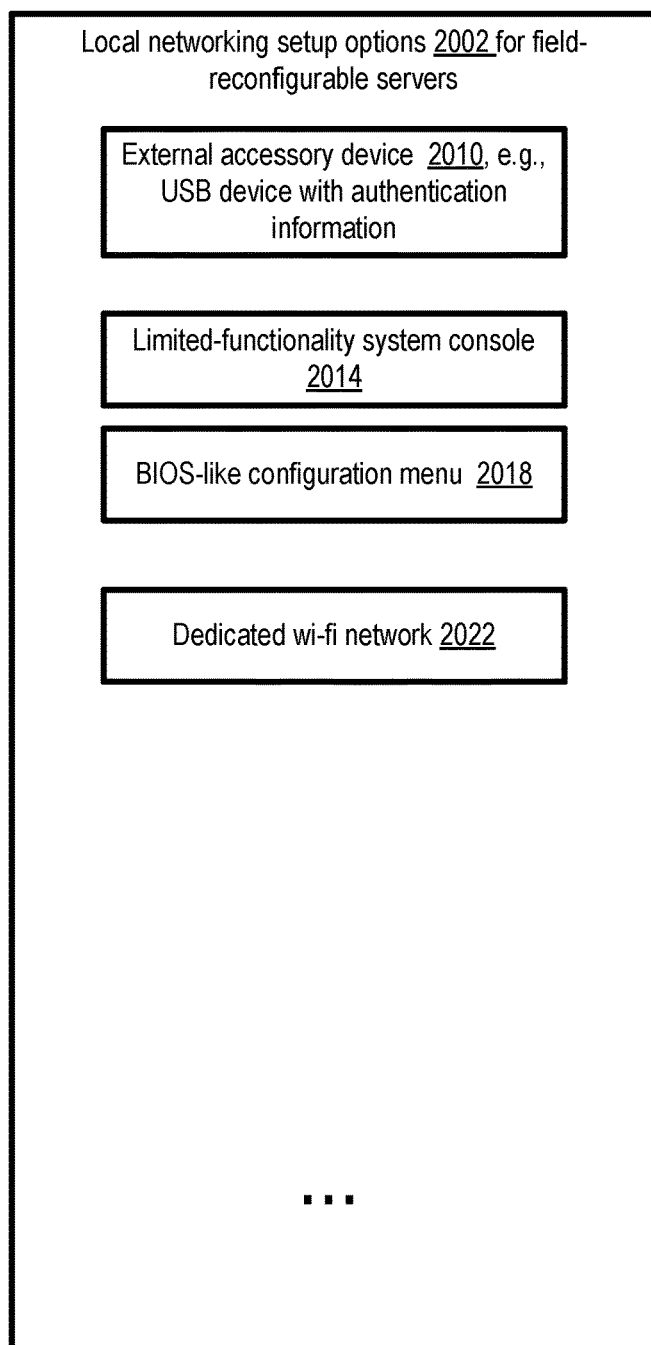
FIG. 20 illustrates example alternative techniques that may be utilized to set up local networks at a field-reconfigurable server, according to at least some embodiments.

In some embodiments, a client may wish to set up a local network for IP traffic between an FS deployed in the field and one or more external endpoints (such as a set of laptops or tablet devices in the vicinity of the FS). Several options may be supported for setting up such a network. The parameters an authorized user may wish to specify for the local network may include, among others, selecting an IP address type or source, such as whether DHCP (Domain Host Control Protocol) is to be used for the FS's IP address or a static IP address is to be used, the particular static IP address to be used if the static option is preferred, a netmask, a default gateway and the like. FIG. 20 illustrates example alternative techniques that may be utilized to set up local networks at a field-reconfigurable server, according to at least some embodiments. As discussed earlier, in some embodiments local networking setup options 2002 for an FS may include using an external accessory device 2010, such as a USB device or stick, comprising authentication information needed to permit networking configuration. An FS base unit may include several USB ports (or ports for attaching small accessory devices other than PHMs via other similar interfaces). During a boot procedure of the FS, such ports may be scanned by a configuration manager or other privileged program of the FS to determine whether any of the ports has a physical accessory device which contains an authentication artifact chosen (e.g., by a cloud provider network service control plane server, or by the FS administrator) in advance for the FS in some embodiments. If such authentication information can be extracted and verified, a web-based console for IP networking setup may be launched, e.g., using the primary processors of the base unit of the FS. The web-based console may be accessed using a specific IP address selected in advance in some embodiments. After the console is made available, an authorized user may connect to it, e.g., via a laptop or a tablet computer linked to the FS via an Ethernet cable, and provide input indicating configuration settings for IP connectivity with other endpoints external to the FS in at least one embodiment.

In one embodiment, a limited-functionality system console 2014 similar to the system consoles used in data centers may be connected to the FS, e.g., via a serial or USB interface. The system console functionality supported for an FS may be limited to enabling IP networking configuration settings to be provided for the FS in some embodiments, thereby preventing any other types of configuration changes at the FS in the field.

According to some embodiments, networking configuration setup may be performed using a BIOS (Basic Input/Output System)-like configuration menu 2018. An authorizes user may be able to enter a pre-selected sequence of soft keys of the base unit of an FS and be presented with forms that can be used to enter networking configuration information for IP connectivity to/from the FS. In one embodiment, a dedicated wi-fi network 2022 may be set up at an FS when the FS is powered on, and used to enter networking configuration parameters for a local network. Other approaches may be supported for local networking configuration of an FS in different embodiments.

Figure 21:
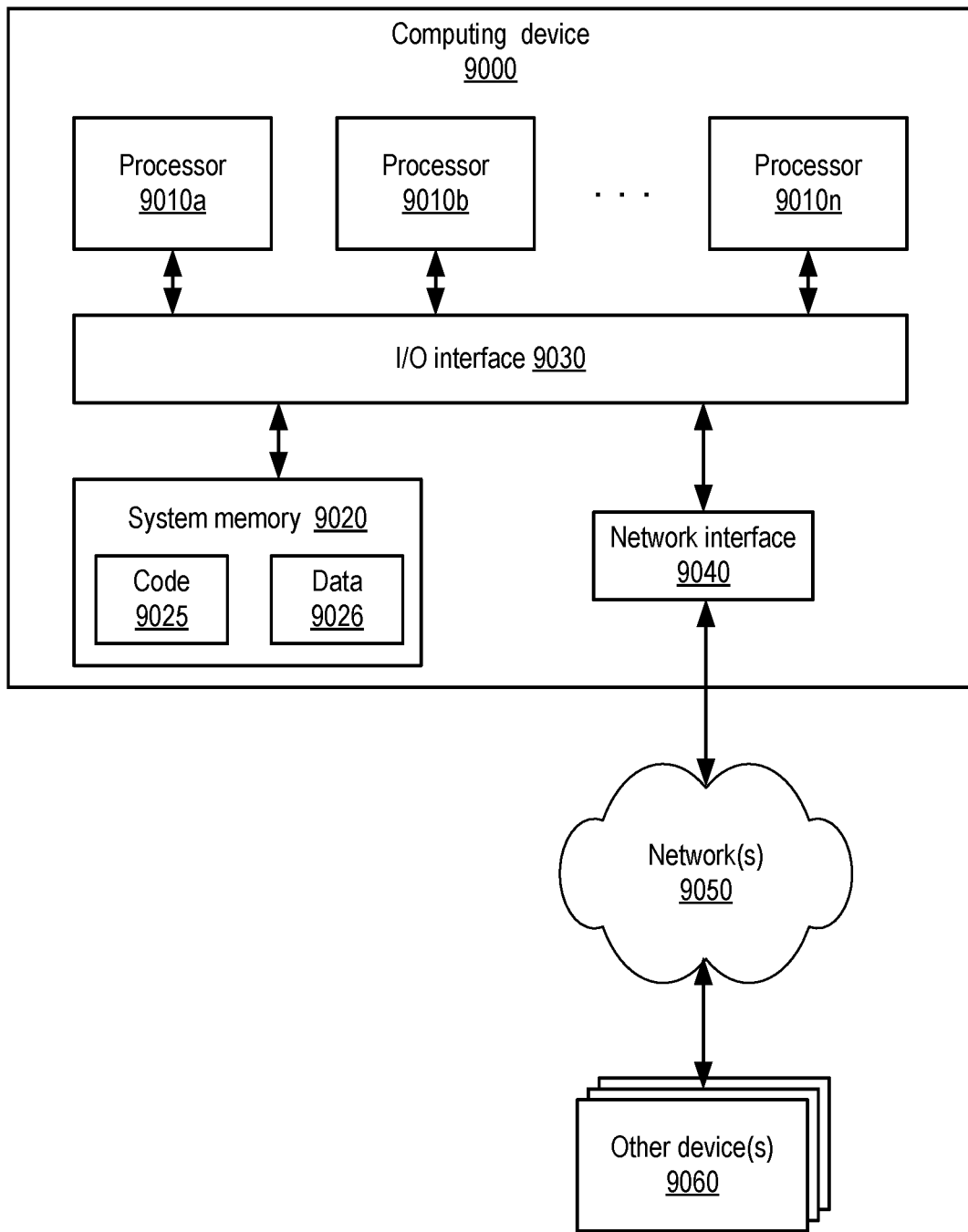
FIG. 21 is a block diagram illustrating an example computing device that may be used in at least some embodiments.

In at least some embodiments, a server that implements at least some of the types of techniques described herein (e.g., various functions of a provider network service such as an RCNMS and/or a VCS, and/or the base unit of a field-reconfigurable server) may include a general-purpose computer system that includes or is configured to access one or more computer-accessible media. FIG. 21 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 20, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the systems, methods, and apparatus discussed in the context of FIG. 1 through FIG. 20. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 21 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
  a computing device provided by a cloud provider network, wherein the computing device includes a primary processor and a memory, wherein an enclosure within which the primary processor and the memory are incorporated comprises a set of externally-accessible slots for attaching one or more pluggable hardware modules to the computing device without disassembly of the enclosure; and
  a first pluggable radio access network (RAN) module comprising (a) circuitry implementing a radio frequency (RF) function and (b) an auxiliary processor implementing a first network function of a RAN node of a mobile private network (MPN);

wherein the memory stores program instructions that when executed on the primary processor:

during a first time interval in which connectivity between the computing device and the cloud provider network is unavailable, detect that the first pluggable RAN module has been attached to the computing device via an externally-accessible slot of the set of externally-accessible slots;

in response to determining that the first pluggable RAN module satisfies a security criterion, launch a second network function of a mobile core network of the MPN;

process, at the second network function, output of the first network function, wherein the output is generated at the auxiliary processor in response to a message from a user equipment device of the MPN, and wherein the message is (a) received at the computing device via a radio antenna and (b) processed using the circuitry; and during a second time interval in which connectivity between the computing device and the cloud provider network is available, transmit a data set to the cloud provider network, wherein at least a portion of the data set is collected during the first time interval.

2. The system as recited in claim 1, wherein the second network function is launched while the computing device is in a first location, wherein the message is one of a plurality of messages sent from the user equipment device during a communication session, and wherein the memory stores further program instructions that when executed on the primary processor:

process, at the second network function while the computing device is being transported from the first location to a second location, additional output of the first network function, wherein the addition output is generated at the auxiliary processor in response to another message sent from the user equipment device during the communication session.

3. The system as recited in claim 1, wherein the memory stores further program instructions that when executed on the primary processor:

detect that (a) the first pluggable RAN module has been detached from the computing device while the computing device remains powered on and (b) a second pluggable RAN module has been attached to the computing device via the externally-accessible slot while the computing device remains powered on, wherein a maximum rate at which the first network function can be executed at the second pluggable RAN module exceeds a maximum rate at which the first network function can be executed at the first pluggable RAN module; and process, at the second network function, additional output of the first network function, wherein the additional output is generated at the second pluggable RAN module.

4. The system as recited in claim 1, wherein the memory stores further program instructions that when executed on the primary processor:

obtain, from a second pluggable hardware module attached to the computing device via another externally-accessible slot of the enclosure, results of a computation which is not a network function of an MPN.

5. The system as recited in claim 1, wherein the memory stores further program instructions that when executed on the primary processor:

launch, at the computing device, a compute instance which implements a programmatic interface of a virtualized computing service of a cloud provider network, wherein the second network function is launched within the compute instance.

6. A computer-implemented method, comprising:

detecting that a first pluggable network function execution module has been attached to a base unit of a computing device via an externally-accessible slot of the computing device, wherein the base unit comprises a primary processor of the computing device, and wherein the first pluggable network function execution module is configured to execute a first network function of a radio-based communication network;

launching, using the primary processor of the computing device, after said detecting, a second network function of the radio-based communication network in response to determining that the first pluggable network function execution module satisfies one or more security criteria, including that the first pluggable network function module is in an approved category of pluggable network function execution modules for use on the computing device; and performing, by the second network function, one or more computations on output of the first network function, wherein the output is generated at the first pluggable network function execution module in response to a first message from a first user equipment device of the radio-based communication network.

7. The computer-implemented method as recited in claim 6, wherein the second network function is launched during a first time interval in which the computing device is in a first location, and wherein the first message is one of a plurality of messages of a communication session between the first user equipment device and a second user equipment device of the radio-based communication network, the computer-implemented method further comprising:

performing, using the second network function during a second time interval in which the computing device is being transported from the first location to a second location, an additional computation on additional output of the first network function, wherein the addition output is generated at the first pluggable network function execution module in response to a second message of the communication session.

8. The computer-implemented method as recited in claim 6, further comprising:

detecting that (a) the first pluggable network function execution module has been detached from the computing device while the computing device remains powered on and (b) a second pluggable network function execution module has been attached to the computing device via the externally-accessible slot while the computing device remains powered on, wherein a first maximum rate at which the first network function can be executed at the second pluggable network function execution module exceeds a second maximum rate at which the first network function can be executed at the first pluggable network function execution module; and utilizing the second pluggable network function execution module to execute, with respect to additional messages of the radio-based communication network, the first network function at a rate that exceeds the second maximum rate.

9. The computer-implemented method as recited in claim 6, wherein the first pluggable network function execution module comprises circuitry to execute a first set of network functions including the first network function, the computer-implemented method further comprising:
- detecting that (a) the first pluggable network function execution module has been detached from the computing device and (b) a second pluggable network function execution module has been attached to the computing device via the externally-accessible slot; and
- utilizing the second pluggable network function execution module to execute, with respect to additional messages of the radio-based communication network, a third network function, wherein the third network function is not in the first set of network functions.

10. The computer-implemented method as recited in claim 6, wherein the first message is one of a plurality of messages of a communication session of the first user equipment device, the computer-implemented method further comprising:
- performing, at a pluggable hardware module attached to the computing device via another externally-accessible slot, a particular computation on data obtained from one or more messages of the plurality of messages.

11. The computer-implemented method as recited in claim 6, wherein the externally-accessible slot includes a plurality of physical interfaces including one or more of (a) a Peripheral Component Interconnect-Express (PCIe) interface or (b) a Universal Serial Bus (USB) interface.

12. The computer-implemented method as recited in claim 6, further comprising:
- launching, at the computing device, a compute instance of a virtualized computing service of a cloud computing environment, wherein the compute instance is configured to run at the computing device without connectivity to a data center of the cloud computing environment, and wherein the second network function is executed within the compute instance.

13. The computer-implemented method as recited in claim 6, further comprising:
- launching, at the computing device, a program implementing at least a subset of functionality of a service of a cloud computing environment; and
- utilizing the program to perform one or more computations on data received from the first user equipment device during a time interval in which the computing device is not connected to the service of the cloud computing environment.

14. The computer-implemented method as recited in claim 6, further comprising:
- storing, at the computing device, metadata associated with one or more of categories of pluggable hardware modules that has been approved for the computing device, wherein determining that the first pluggable network function execution module satisfies the one or more security criteria comprises utilizing the metadata.

15. The computer-implemented method as recited in claim 6, wherein the first network function is a network function of (a) a radio access network (RAN) node of the radio-based communication network, or (b) a mobile core network of the radio-based communication network.

16. A non-transitory computer-accessible storage medium storing program instructions that when executed on a processor of a base unit of a computing device:
- detect that a first pluggable network function execution module has been attached to the base unit via an externally-accessible slot of an enclosure of the base unit, wherein the first pluggable network function execution module is configured to execute a first network function of a radio-based communication network;
- in response to determining that the first pluggable network function execution module satisfies one or more security criteria, including that the first pluggable network function module is in an approved category of pluggable network function execution modules for use on the computing device, launch a second network function of the radio-based communication network; and
- perform, by the second network function, one or more computations on output of the first network function, wherein the output is generated at the first pluggable network function execution module in response to a first message from a user equipment device of the radio-based communication network.

17. The non-transitory computer-accessible storage medium as recited in claim 16, wherein the second network function is launched during a first time interval in which the computing device is in a first location, wherein the first message is one of a plurality of messages sent from the user equipment device during a communication session, and wherein the non-transitory computer-accessible storage medium stores further program instructions that when executed on the processor of the base unit:
- process, at the second network function during a second time interval in which the computing device is being transported from the first location to a second location, additional output of the first network function, wherein the addition output is generated at the first pluggable network function execution module in response to a second message sent from the user equipment device during the communication session.

18. The non-transitory computer-accessible storage medium as recited in claim 16, wherein the non-transitory computer-accessible storage medium stores further program instructions that when executed on the processor of the base unit:
- detect that (a) the first pluggable network function execution module has been detached from the computing device while the computing device remains powered on and (b) a second pluggable network function execution module has been attached via the externally-accessible slot while the computing device remains powered on, wherein a maximum rate at which the first network function can be executed at the second pluggable network function execution module exceeds a maximum rate at which the first network function can be executed at the first pluggable network function execution module; and
- perform, by the second network function, one or more additional computations on addition output of the first network function, wherein the additional output is generated at the second pluggable network function execution module.

19. The non-transitory computer-accessible storage medium as recited in claim 16, wherein the first pluggable network function execution module is configured to execute a first set of network functions including the first network function, and wherein the non-transitory computer-accessible storage medium stores further program instructions that when executed on the processor of the base unit:
- detect that (a) the first pluggable network function execution module has been detached from the computing device and (b) a second pluggable network function execution module has been attached to the computing device via the externally-accessible slot; and process additional output of a third network function, wherein the additional output is generated at the second pluggable network function execution module, and wherein the third network function is not in the first set of network functions.

20. The non-transitory computer-accessible storage medium as recited in claim 16, wherein the non-transitory computer-accessible storage medium stores further program instructions that when executed on the processor of the base unit:

obtain, from a second pluggable hardware module attached to the computing device via another externally-accessible slot of the enclosure, results of a computation which is not a network function.

\* \* \* \* \*